(12) United States Patent
Ishida

(10) Patent No.: US 8,997,610 B2
(45) Date of Patent: Apr. 7, 2015

(54) CUTTING INSERT, CUTTING TOOL, AND METHOD OF MANUFACTURING MACHINED PRODUCT USING THE SAME

(75) Inventor: Takuya Ishida, Fukuoka (JP)

(73) Assignee: Kyocera Corporation, Kyoto (JP)

( * ) Notice: Subject to any disclaimer, the term of this patent is extended or adjusted under 35 U.S.C. 154(b) by 225 days.

(21) Appl. No.: 13/512,254

(22) PCT Filed: Nov. 29, 2010

(86) PCT No.: PCT/JP2010/071279
§ 371 (c)(1),
(2), (4) Date: Jun. 4, 2012

(87) PCT Pub. No.: WO2011/065540
PCT Pub. Date: Jun. 3, 2011

(65) Prior Publication Data
US 2012/0294686 A1    Nov. 22, 2012

(30) Foreign Application Priority Data

Nov. 27, 2009   (JP) ................................ 2009-270533
Feb. 26, 2010   (JP) ................................ 2010-042986
Apr. 27, 2010   (JP) ................................ 2010-102179

(51) Int. Cl.
*B23C 5/06*      (2006.01)
*B23C 5/20*      (2006.01)

(52) U.S. Cl.
CPC ............. *B23C 5/06* (2013.01); *B23C 2200/086* (2013.01); *B23C 5/202* (2013.01); *B23C 2200/128* (2013.01); *B23C 2200/205* (2013.01);
(Continued)

(58) Field of Classification Search
CPC .... B23C 5/06; B23C 5/202; B23C 2200/128; B23C 2200/205; B23C 2200/326; B23C 2200/086; B23C 2200/081
USPC ........................................... 407/113; 82/1.11
See application file for complete search history.

(56) References Cited

U.S. PATENT DOCUMENTS 5,222,843 A * 6/1993 Katbi et al. .................. 407/114
8,025,465 B2 * 9/2011 Ishida ........................... 407/114
(Continued)

FOREIGN PATENT DOCUMENTS

JP    05-053807 U    7/1993
JP    08-118135      5/1996
(Continued)

*Primary Examiner* — Will Fridie, Jr.
(74) *Attorney, Agent, or Firm* — Volpe and Koenig, P.C.

(57) ABSTRACT

A cutting insert according to an embodiment of the present invention includes an upper surface; a lower surface; a side surface located between the upper surface and the lower surface; at least one concave part extending in a thickness direction in the side surface, and having one end thereof located at the upper surface; and a cutting edge which is located at an intersection region of the upper surface and the side surface, and is divided into a plurality of divided cutting edges with the at least one concave part interposed therebetween. The upper surface includes a first raised part located inwardly of the at least one concave part, and a plurality of second raised parts respectively located inwardly of the plurality of divided cutting edges. The plurality of the second raised parts are located inward compared to one end of the first raised part close to the cutting edge in a top view. A cutting tool including the cutting insert, and a method of manufacturing a machined product using the cutting tool are also provided.

20 Claims, 17 Drawing Sheets

(52) U.S. Cl.
CPC ..... *B23C2200/323* (2013.01); *B23C 2200/081* (2013.01); *B23C 2200/082* (2013.01); *B23C 2200/087* (2013.01)

(56) References Cited

U.S. PATENT DOCUMENTS

| 8,210,777 | B2 * | 7/2012 | Ishida | 407/113 |
| 8,419,320 | B2 * | 4/2013 | Sung et al. | 407/113 |
| 2009/0188356 | A1 | 7/2009 | Ishida | |
| 2012/0034041 | A1 * | 2/2012 | Koga | 407/103 |

FOREIGN PATENT DOCUMENTS

| JP | 2008/000840 | 1/2008 |
| WO | WO 2007/049617 A1 | 5/2007 |

\* cited by examiner

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

A indexable tool having cutting inserts respectively attached to a plurality of insert pockets located along a rotation direction of an outer peripheral surface at the front end of a holder has conventionally been used as a cutting insert (rotating tool), such as a face milling cutter or an end mill. As the cutting inserts, those intended to decrease cutting resistance by disposing grooves for dividing a cutting edge into divided cutting edges on a side surface have been used (for example, refer to Japanese Unexamined Patent Publication No. 9-57519). Cutting processing with these cutting inserts generates a plurality of chips finely divided in the width direction thereof.

However, the foregoing conventional cutting inserts have suffered from the problem that the finely divided chips cannot smoothly be discharged. For example, a discharge direction of the chips generated by the divided cutting edges becomes unstable, and the chips may be caught in the grooves, thereby damaging the cutting inserts, the holder, or a machined surface. This problem is significant when a workpiece is a material having rich ductility.

SUMMARY OF THE INVENTION

An object of the present invention is to provide a cutting insert and a cutting tool, which have both cutting resistance decreasing action and excellent chip discharge performance, and also a method of manufacturing a machined product using the cutting tool.

Another object of the present invention is to provide a cutting insert and a cutting tool, which allow for long life by mitigating cutting resistance, and also a method of manufacturing a machined product using the cutting tool.

Still another object of the present invention is to provide a cutting insert and a cutting tool, which achieve excellent chip discharge performance by stabilizing a discharge direction of chips, and also a method of manufacturing a machined product using the cutting tool.

A cutting insert according to one embodiment of the present invention includes an upper surface, a lower surface, a side surface located between the upper surface and the lower surface, at least one concave part extending in a thickness direction in the side surface, and having one end thereof located at the upper surface, and a cutting edge which is located at an intersection region of the upper surface and the side surface, and is divided into a plurality of divided cutting edges with the at least one concave part interposed therebetween. The upper surface includes a first raised part located inwardly of the at least one concave part, and a plurality of second raised parts respectively located inwardly of the plurality of divided cutting edges. The plurality of the second raised parts are located inward compared to one end of the first raised part close to the cutting edge in a top view.

In a cutting insert according to another embodiment of the present invention, the upper surface further includes a plurality of flat regions respectively continuous with the plurality of divided cutting edges in which a distance L1 in a direction away from each of the divided cutting edges decreases as going from both end portions of each of the divided cutting edges to a midportion thereof.

In a cutting insert according to still another embodiment of the present invention, the upper surface further includes a plurality of flat regions respectively located inwardly of the plurality of divided cutting edges; and a plurality of rake surfaces which are respectively located inwardly of the plurality of flat regions, and are inclined to come closer to the lower surface as departing from the flat regions. A boundary region of each of the flat regions and each of the rake surfaces includes two first boundary regions located close to both ends of the boundary region, and a second boundary region located between the two first boundary regions and located closer to the divided cutting edges than the first boundary regions. The plurality of rake surfaces include a third rake surface located inwardly of the first boundary regions, and a fourth rake surface located inwardly of the second boundary region. The first boundary regions are located at a higher position than the fourth rake surface.

A cutting tool according to an embodiment of the present invention includes the cutting insert and a holder configured to attach the cutting insert to a front end thereof.

A method of manufacturing a machined product according to an embodiment of the present invention includes rotating the cutting tool; bringing the cutting tool being rotated and a workpiece close together; bringing the cutting edge of the cutting tool and the workpiece into contact with each other; and separating the cutting tool and the workpiece from each other.

The cutting insert according to the one embodiment of the present invention includes the at least one concave part extending in the thickness direction, and having the one end thereof located at the upper surface. Therefore, a certain region of the workpiece that corresponds to the concave part remains uncut, and cutting resistance can be decreased according to the amount of the region remaining uncut. Further, the upper surface includes the first raised part located inwardly of the at least one concave part. Thereby, the chips generated and finely divided in the width direction thereof can graze while allowing the end portions of the chips in the width direction to contact with the first raised part during a discharge process. Thus, the chips are guided by the first raised part, and therefore can be discharged while reducing lateral vibration of the chips with respect to a travel direction during generation of the chips.

Additionally, the upper surface further includes the plurality of second raised parts respectively located inwardly of the plurality of divided cutting edges. Therefore, the chips are deformed so that the midportion in the width direction thereof is pulled up by the second raised part in the discharge process. Consequently, the chips are subjected to so-called work hardening, and the stiffness of the chips is enhanced. This reduces the probability that the chips cling to each other in the vicinity of the divided cutting edge, and also makes it easier for the chips to be divided by a proper length. Therefore, even when the workpiece is a material having rich ductility, excellent chip charge performance can be obtained by the cutting insert of the one embodiment of the present invention.

According to the cutting insert of the another embodiment of the present invention, the upper surface further includes the plurality of flat regions respectively continuous with the plurality of divided cutting edges in which the distance L1 in the direction away from each of the divided cutting edges decreases as going from both end portions of each of the divided cutting edges to the midportion thereof. Therefore, the strength of the divided cutting edges can be improved by including the flat regions. Additionally, for example, when the region remaining uncut by another cutting insert having the same configuration is cut by the divided cutting edges of the cutting insert of the present embodiment, cutting resistance can be decreased and the vibration of the cutting insert can be reduced by decreasing a contact area with the workpiece in the midportion of each of the divided cutting edges at which the contact area with the workpiece is relatively large. Consequently, cutting edge fracture can be reduced, and machined surface roughness can be decreased.

According to the cutting insert of the still another embodiment of the present invention, the boundary region of each of the flat regions and each of the rake surfaces includes the two first boundary regions located close to both ends of the boundary region, and the second boundary region located between the two first boundary regions and located closer to the divided cutting edges than the first boundary regions. Each of the rake surfaces includes the third rake surface located inwardly of the first boundary regions, and the fourth rake surface located inwardly of the second boundary region. The first boundary regions are located at the higher position than the fourth rake surface. Owing to this configuration, the chips generated by the divided cutting edges are narrowed down in the width direction thereof by the high-position first boundary regions located at both sides of the fourth rake surface when the chips pass through the fourth rake surface. Hence, the discharge direction of the chips generated by the divided cutting edges is further stabilized to reduce the probability that the chips are caught in the concave part and the chips collide with each other, thereby obtaining more excellent chip discharge performance.

PREFERRED EMBODIMENTS FOR CARRYING OUT THE INVENTION

<Cutting Insert>
(First Embodiment)

A cutting insert (hereinafter referred to as an "insert") according to a first embodiment of the present invention is described in detail below with reference to FIGS. 1 to 5.

Figure 1:
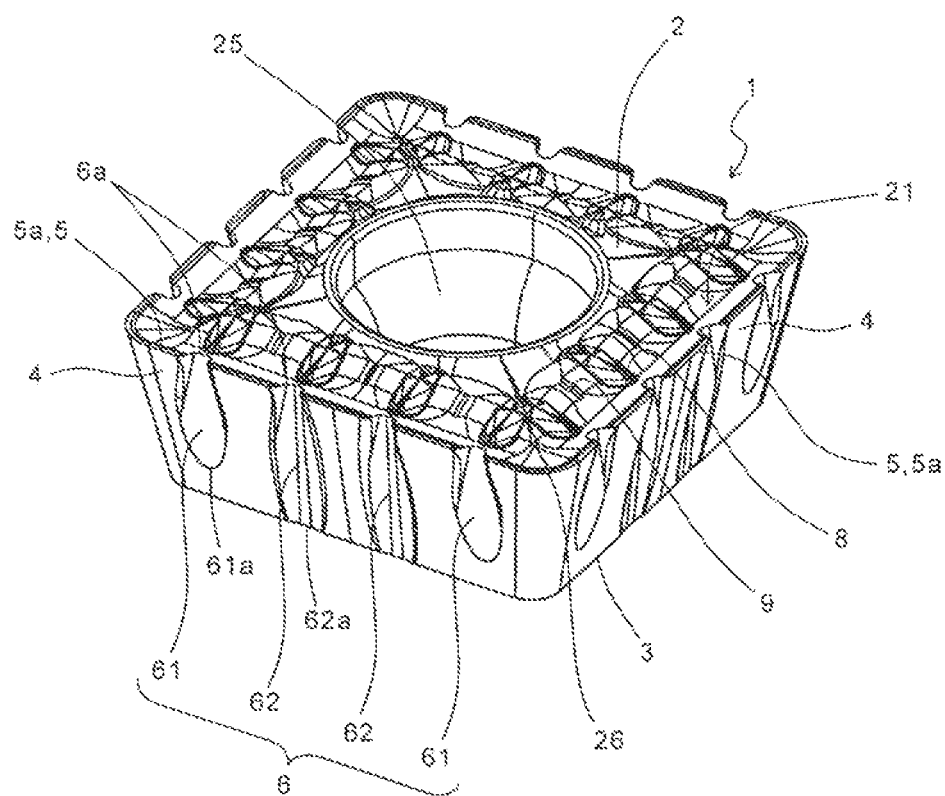
FIG. 1 is a perspective view showing a cutting insert according to a first embodiment of the present invention.

As shown in FIG. 1, the insert 1 according to the present embodiment includes a body having an upper surface 2, a lower surface 3, a side surface 4 located between the upper surface 2 and the lower surface 3, and a cutting edge 5 located at an intersection region of the upper surface 2 and the side surface 4.

The body is a sintered body, such as cemented carbide, cermet, or ceramics, having a film coated thereon. The film is for improving wear resistance of the insert 1. Examples of the film composition include titanium-based compounds, such as titanium carbide, titanium nitride, and titanium carbonitride; and alumina. The film needs to be made up of at least one layer, or may be made up of a plurality of layers. Alternatively, the body may be made of the sintered body not coated with the film.

The body is plate-like and preferably has a polygonal shape, such as quadrangle, pentagon, hexagon, or octagon, in a top view. In the present embodiment, the body is in a quadrangle shape (square shape) having four long sides of equal length and four corners.

As shown in FIG. 2(a), the upper surface 2 of the body is in a square shape in a top view, and has, at a midportion thereof, a through hole 25 substantially vertically passing through the upper surface 2 and the lower surface 3. The through hole 25 is for inserting a fixing screw 106 that fixes the insert 1 to a holder 101 described later. The insert 1 has a 90-degree rotationally symmetrical shape with respect to a central axis of the through hole 25. That is, the four cutting edges 5 are arranged to have 90-degree rotational symmetry around the central axis of the through hole 25. Hence, when the cutting edge 5 being used is worn, the cutting edge 5 not yet used can be used by rotating the insert 1 90 degrees. This is economical.

The upper surface 2 includes a breaker groove 21 located along the cutting edge 5 and having a concave shape. The breaker groove 21 is for discharging chips, and includes a rake surface 22 and a rising surface 24 (breaker surface) in order from the side of the cutting edge 5.

The rake surface 22 is located close to the cutting edge 5, and is inclined to come closer to the lower surface 3 at a predetermined rake angle θ1 as going inward. In the present specification, the term "inward" denotes the inward side of the insert 1 with respect to the cutting edge 5, namely, the side close to the though hole 25.

The rising surface 24 is located inward compared to the rake surface 22, and close to a midportion of the upper surface 2, namely, close to the through hole 25, and is inclined to be farther away from the lower surface 3 at a predetermined rake angle θ2 as going inward.

The rake surface and the rising surface 24 are continuous with each other with a bottom surface 23 made up of a concave-shaped curved surface interposed therebetween. Therefore, the breaker groove 21 is formed to be once lowered and then raised as going inward from the cutting edge 5. Thereby, the chips generated by the cutting edge 5 can be discharged after being curled by the rake surface 22 and then formed into a helical shape by the rising surface 24.

The rake angle θ1 and the rising angle θ2 may be respectively adjusted to an optional angle according to a workpiece. Usually, the rake angle θ1 is approximately 10-30°, and the rising angle θ2 is approximately 20-45°, though no special limitation is imposed thereon.

In the present specification, the phrase "rake angle θ1" denotes an angle formed by a line La parallel to the lower surface 3, and the rake surface 22 or a virtual extension line Lb of the rake surface 22 in a cross section perpendicular to the cutting edge 5. In the present specification, the phrase "rising angle θ2" denotes an angle formed by the line La and the rising surface 24 or a virtual extension line Lc of the rising surface 24 in the cross section perpendicular to the cutting edge 5.

A flat region (land) 7 is formed between the rake surface 22 and the cutting edge 5. In the present specification, the phrase "flat region 7" denotes a narrow width band-shaped surface along the cutting edge 5. This improves strength of the cutting edge 5, thereby reducing fracture of the cutting edge 5. A width of the flat region 7 depends on the workpiece and cutting conditions, but is usually approximately 0.05-0.15 mm. Although in the present embodiment, the flat region 7 is a so-called negative land, it may be a positive land in consideration of the relationship with a rake angle of the rake surface 22.

On the other hand, the side surface 4 intersects the upper surface 2 and the lower surface 3, respectively. The side surface 4 is also connected to the upper surface 2 and the lower surface 3, respectively. The side surface 4 is inclined inward at a predetermined clearance angle θ3 as going from the upper surface 2 to the lower surface 3. Therefore, the insert 1 is a so-called positive type insert in which a positive clearance angle θ3 is imparted to the side surface 4. The insert 1 may be a so-called negative type insert in which the side surface 4 is formed perpendicularly to the upper surface 2 and the lower surface 3 from the viewpoint of the strength of the insert 1.

The clearance angle θ3 is an acute angle. The clearance angle θ3 may be adjusted to an optional angle according to the workpiece, and usually, approximately 5-30° is suitable though no special limitation is imposed thereon. In the present specification, the phrase "clearance angle θ3" denotes an angle formed by a line Ld that passes through the cutting edge 5 and is perpendicular to the lower surface 3, and the side surface 4 in a cross section perpendicular to the lower surface 3.

Figure 2:
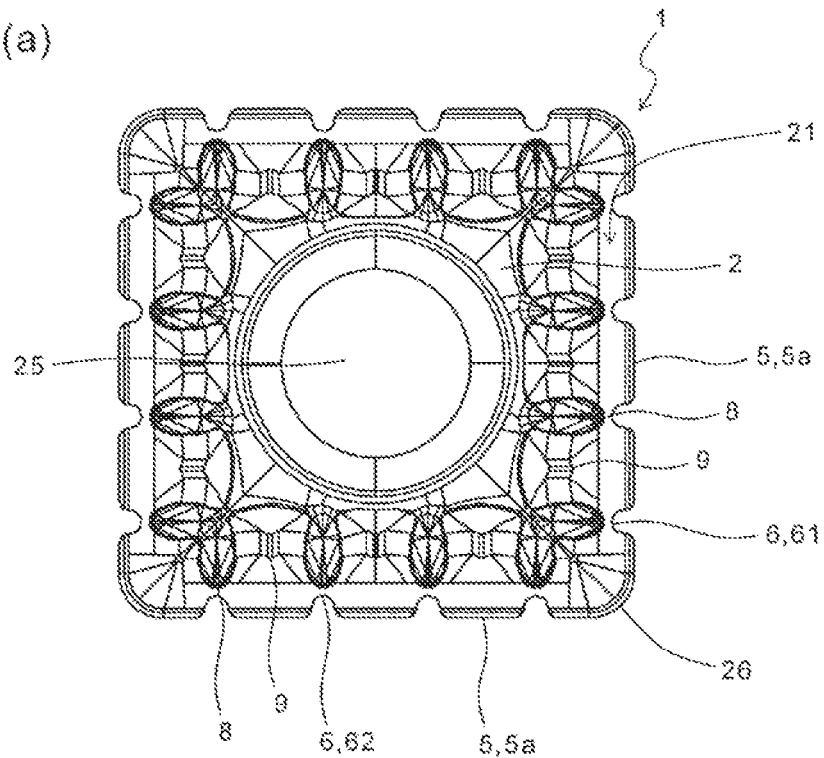
FIG. 2(a) is a top view of the cutting insert shown in FIG. 1.
FIG. 2(b) is a side view thereof.
Figure 2:
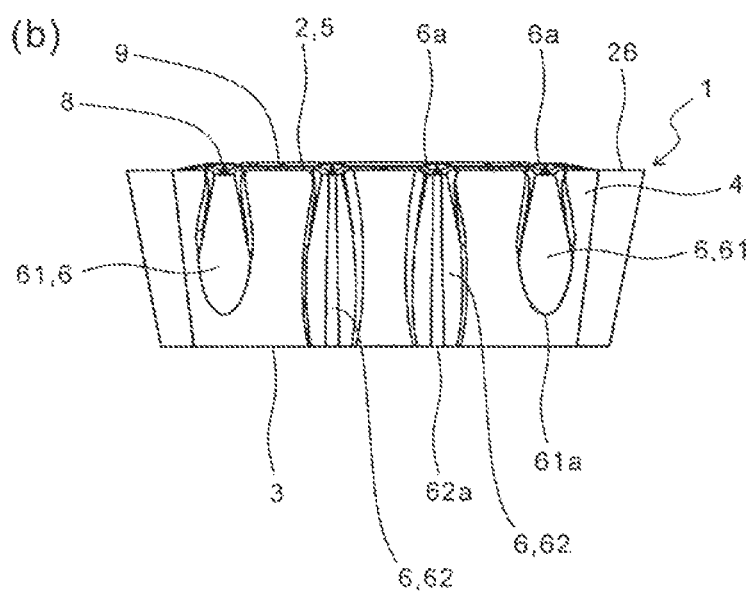
Figure 3:
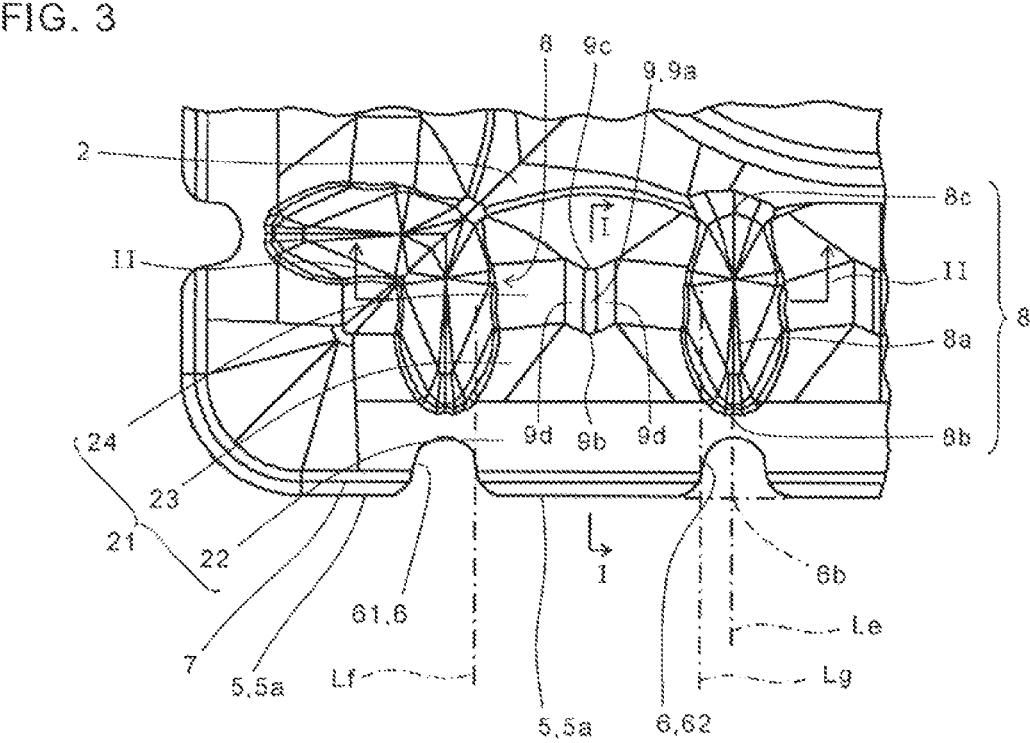
FIG. 3 is a partially enlarged plan view in the vicinity of a cutting edge of the cutting insert shown in FIG. 1.

As shown in FIGS. 1 to 3, a concave part 6 extends along a thickness direction of the insert 1 on the side surface 4. In the present embodiment, the concave part 6 has a groove shape, and is a circular arc shape in a top view. The concave part 6 has one end 6a on the upper surface 2, and is formed to divide the cutting edge 5. In the present embodiment, the four concave parts 6 are formed on the side surface 4, and hence the cutting edge 5 is divided into five divided cutting edges 5a with the concave part 6 interposed therebetween. The individual concave parts 6 are formed at substantially equal intervals on the side surface 4.

The other end of each of the concave parts 6 may be located at the lower surface 3, or may not be located at the lower surface 3. In the present embodiment, each of a pair of first concave parts 61 and 61 among the four concave parts 6, which are located close to both ends of the cutting edge 5, has the other end 61a on the side surface 4 in the vicinity of the lower surface 3. That is, the other end 61a of the first concave part 61 is not located at the lower surface 3. On the other hand, each of a pair of second concave parts 62 and 62 located close to a midportion of the cutting edge 5 has the other end 62a on the lower surface 3. The concave parts 6 having the foregoing configuration are capable of reducing strength deterioration of the insert 1 in the vicinity of corners 26 respectively located at corner portions of the upper surface 2.

During cutting processing by the insert 1, a certain region of the workpiece which corresponds to the concave part 6 remains uncut, thus allowing cutting resistance to be decreased according to the region remaining uncut. Therefore, the insert 1 is suitable for interrupted cutting, high-feed machining, or the like, during which large load is exerted, and is capable of exhibiting excellent cutting performance even under cutting conditions of high cutting speed.

Also during the cutting processing by the insert 1, a plurality of chips finely divided in the width direction thereof are generated because the cutting edge 5 is divided into the plurality of divided cutting edges 5a by the concave parts 6. In the conventional inserts, a plurality of generated chips tend to collide with each other. The collision between the chips unstabilizes a discharge direction of the chips, and the chips are caught between the holder and the workpiece, thereby damaging the insert and the holder, or impairing a machined surface. Particularly, when the workpiece has rich ductility, the generated chips have low stiffness and the chips are apt to cling to each other in the vicinity of the cutting edge. Hence, the foregoing tendency has been remarkable. Even when the workpiece has rich ductility, the insert 1 is capable of exhibiting excellent chip discharge performance because the upper surface 2 includes at least one first raised part 8 located inward of the concave part 6, and a plurality of second raised parts 9 respectively located inward of the plurality of divided cutting edges 5a.

To be specific, the first raised parts 8 are located correspondingly to the concave parts 6. In the present specification, the sentence that the first raised pars 8 "are located correspondingly to the concave parts 6" denotes fulfilling the following requirements (a) and (b):

(a) The first raised parts 8 are respectively located inward compared with the concave parts 6 in a top view; and (b) At least a part of each of the first raised parts 8 is located on a line Le passing through a midportion 6b in the width direction of the concave part 6, and extending along a direction in which the depth of the concave part 6 reaches the largest dimension. In the present embodiment, an upper portion 8a made up of a curved surface of the first raised part 8 is located on the line Le.

The four first raised parts 8 are respectively located correspondingly to the four concave parts 6. These first raised parts 8 are raised up from the upper surface 2, and their respective upper portions 8a extend inward along a direction substantially perpendicular to the cutting edge 5.

Each of these first raised parts 8 has one end 8b located close to the cutting edge 5, and the other end 8c located close to the midportion of the upper surface 2. The one end 8b is located in the rake surface 22 in the vicinity of a boundary region of the rake surface 22 and a bottom surface 23. The other end 8c is located at an inward-side end of the rising surface 24.

Owing to the first raised parts 8 having the foregoing configuration, chips generated by the adjacent divided cutting edges 5a and finely divided in the width direction can graze while allowing both ends of the chips in the width direction to contact with the adjacent first raised parts 8 and 8 in the discharge process thereof. This reduces the probability that the chips vibrate laterally with respect to a travel direction during generation of chips. That is, the first raised parts 8 function as a guide for stabilizing the discharge direction of the chips so that the generated narrow-width chips do not collide with each other. Further, the chips are subjected to a force which pulls up both ends of the chips in the width direction thereof, and a force which pulls down a midportion of the chips in the width direction thereof by the adjacent first raised parts 8 and 8. Consequently, the cross section of the chips can be deformed from a flat shape to a narrowed down shape.

Additionally, the first raised parts 8 are respectively located correspondingly to the concave parts 6, thereby reducing strength deterioration of the insert 1 in the vicinity of the concave parts 6. That is, the thickness of the insert 1 decreases according to the formation of the concave parts 6, and the strength of the insert 1 in the vicinity of the concave parts 6 is somewhat lowered. Owing to the first raised parts 8 located correspondingly to the concave parts 6, the strength of the insert 1 can be improved in proportion to the increase in the thickness of the insert 1 in the vicinity of the concave parts 6. It is therefore capable of reducing the strength deterioration of the insert 1 in the vicinity of the concave parts 6.

On the other hand, second raised parts 9 are located correspondingly to the cutting edge 5 divided by the concave parts 6, namely, the divided cutting edges 5a. In the present specification, the sentence that the second raised parts 9 "are located correspondingly to the divided cutting edges 5a" denotes fulfilling the following requirements (c) and (d):

(c) The second raised parts 9 are located inward compared to the divided cutting edges 5a in a top view; and (d) The second raised parts 9 are located between lines Lf and Lg, each of which passes through both ends of the divided cutting edges 5a and is perpendicular to the cutting edge 5 in the top view, as shown in FIG. 3.

Each of the second raised parts 9 is located inward compared to one end 8b of the first raised part 8 close to the cutting edge 5 in the top view. Therefore, the chips generated and finely divided in the width direction thereof are firstly guided in a discharge direction by the first raised parts 8, and the chips are brought into contact with the second raised parts 9. When the chips contact and graze the second raised parts 9, the midportion of the chips in the width direction thereof narrowed down by the first raised parts 8 is pulled up by the second raised parts 9. Consequently, the chips are subjected to so-called work hardening in which the chip hardness is increased, and the stiffness of the chips is enhanced. Therefore, even when the workpiece is a material having rich ductility from which chips of low stiffness are generated, it is capable of reducing the probability that the chips cling to each other in the vicinity of the cutting edge 5, and it makes it easier for the chips to be divided by a proper length.

It is therefore capable of reducing the damage to the cutting edge 5 and the holder, and deterioration of the machined surface of the workpiece, poor machining accuracy, or the like, due to the chips caught between the cutting edge 5 and the workpiece. Further, the second raised parts 9 allow the chips to contact the upper surface 2 through an appropriate contact area, and hence, the frictional resistance between the chips and the upper surface 2 can be decreased, thereby reducing welding of the chips to the upper surface 2. Consequently, even when the workpiece is the material having rich ductility, the insert 1 is capable of exhibiting excellent chip discharge performance. Particularly, even in a cutting processing mode in which a large load is exerted during the cutting processing, the excellent chip discharge performance can be exhibited while decreasing the cutting resistance exerted during the cutting.

A first edge portion 9b of each of the second raised parts 9 is located close to the cutting edge 5. A distance from the one end 8b of the first raised part 8 to the first edge portion 9b of the second raised part 9 can be set optionally as long as chips generated can contact the first raised part 8 and the second raised part 9 in order. No special limitation is imposed thereon. In the present embodiment, the first edge portion 9b of the second raised part 9 is located at a boundary region of the bottom surface 23 and the rising surface 24.

Figure 4:
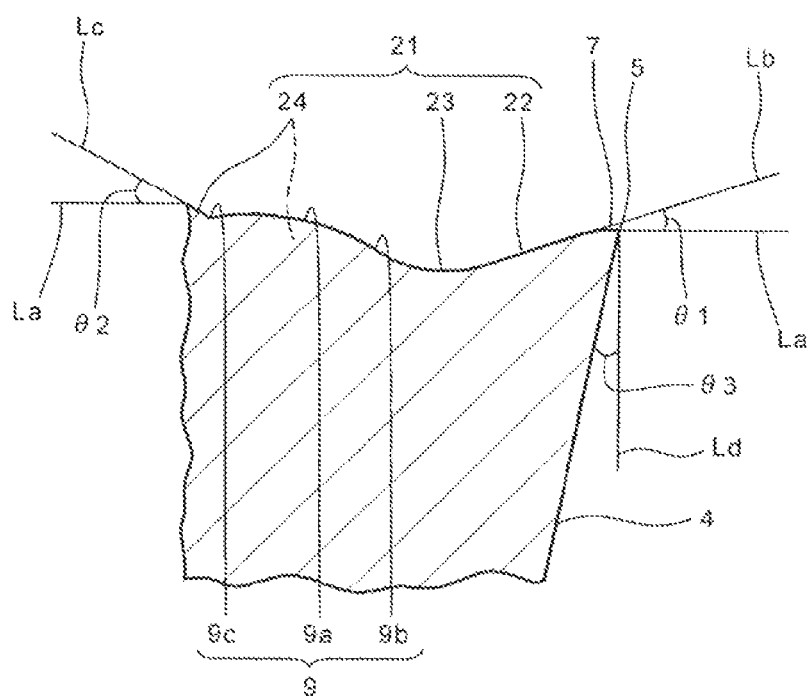
FIG. 4 is a diagram showing an enlarged broken-out section taken along the line I-I of FIG. 3.

The first edge portion 9b of the second raised part 9 is continuous with the bottom surface 23 as shown in FIG. 4. This permits smooth contact and graze of the chips with respect to the second raised part 9, thereby reducing fracture of the second raised part 9 by the impact caused by the contact between the chips and the second raised part 9.

In the second raised part 9, an upper portion 9a made up of a curved surface extends inward along a direction substantially perpendicular to the cutting edge 5, as shown in FIG. 3. The second raised part 9 is raised up along a direction substantially perpendicular to the rising surface 24. A second edge portion 9c of the second raised part 9 is located opposite the first edge portion 9b and close to the midportion of the upper surface 2. The first edge portion 9b and the second edge portion 9c of the second raised part 9 have a convex shape that comes closer to the cutting edge 5 in a top view. This makes it easier for the second raised part 9 to pull up the midportion of the chips in the width direction thereof, thereby enhancing stiffness of the chips.

The second raised part 9 corresponds to the rising surface 24 in a top view, and is located between the adjacent first raised parts 8 and 8, and located at a substantially midportion in a direction along the cutting edge 5. This makes it easier for the second raised part 9 to contact the midportion of the chips in the width direction thereof.

Figure 5:
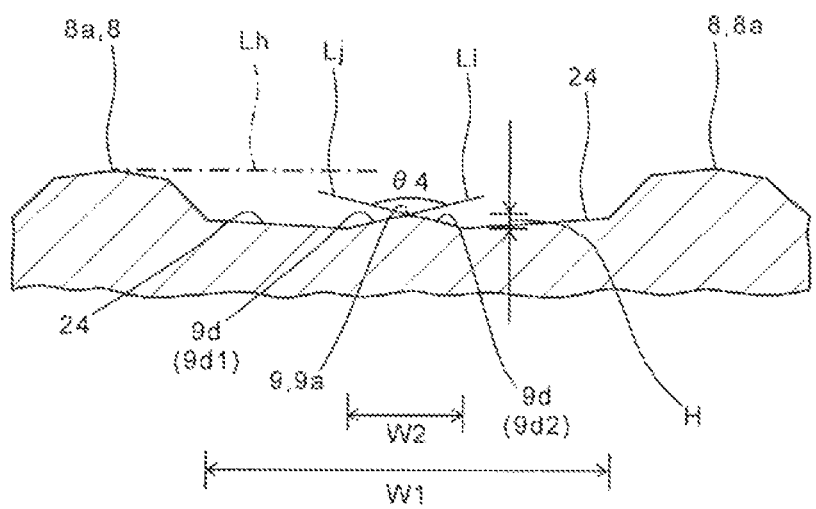
FIG. 5 is a diagram showing an enlarged broken-out section taken along the line II-II of FIG. 3.

As shown in FIG. 5, the second raised part 9 is located closer to the lower surface 3 than a line Lh which passes through the upper portion 8a of the first raised part 8, and is parallel to the lower surface 3. This allows the midportion of the chips in the width direction thereof to be appropriately pulled up by the second raised part 9, thereby stabilizing the chip discharge direction.

As shown in FIG. 3, the second raised part 9 further includes a pair of side portions 9d and 9d which are respectively located at both sides of the upper portion 9a, and are inclined from the upper portion 9a toward the lower surface 3 in a top view. That is, the second raised part 9 includes the pair of side portions 9d and 9d inclined to come closer to the lower surface 3 as going from the upper portion 9a to the rising surface 24. The pair of side portions 9d and 9d extend inward along the direction substantially perpendicular to the cutting edge 5.

The pair of side portion 9d and 9d are formed in a slope shape from the rising surface 24 to the upper portion 9a. As shown in FIG. 5, an angle θ4 formed by the pair of side portion 9d and 9d is an obtuse angle. That is, the angle θ4 formed by a virtual extension line Li obtained by elongating upward one side portion 9d1, and a virtual extension line Lj obtained by elongating upward the other side portion 9d2 is the obtuse angle. This ensures the strength of the second raised part 9, thereby reducing the fracture of the second raised part 9 due to the impact caused by the contact between the chips and the second raised part 9. The angle θ4 is preferably 100-170°.

W1 and W2 have a relationship of W1:W2=1:0.1 to 0.5, where W1 is a width of the rising surface 24 located between the adjacent first raised parts 8 and 8, and W2 is a width of the second raised part 9. W1 and H have a relationship of W1:H=1:0.01 to 0.05, where H is a height of the second raised part 9. When the second raised part 9 and the rising surface 24 have the foregoing relationships, the chips surely contact not only the second raised part 9 but also the rising surface 24. This stabilizes the chip discharge direction, thus allowing the chips curled by the rake surface 22 to be helically deformed and discharged.

In the present specification, the width "W1" of the rising surface 24 denotes a maximum size in a direction along the cutting edge 5 on the rising surface 24 located between the adjacent first raised parts 8 and 8. In the present specification, the width "W2" of the second raised part 9 denotes a maximum size of the second raised part 9 in a direction along the cutting edge 5 in a top view. In the present specification, the height "H" of the second raised part 9 denotes a maximum size of the second raised part 9 in a direction perpendicular to a line which passes through the upper portion 9a of the second raised part 9, and connects the first edge portion 9b and the second edge portion 9c of the second raised part 9 in a cross section perpendicular to the cutting edge 5.

The rising surface 24 is inclined to come closer to the lower surface 3 as going from the first raised part 8 to the adjacent second raised part 9. This Makes it easier for the chips to be deformed into a specific shape, thereby enhancing the stiffness of the chips. No special limitation is imposed on an inclination angle of the rising surface 24, and an optional angle may be employed according to the workpiece.
(Second Embodiment)

An insert according to the second embodiment of the present invention is described in detail with reference to FIGS. 6 to 10. In FIGS. 6 to 10, the same components as the foregoing FIGS. 1 to 5 are identified by the same reference numerals, and the description thereof is omitted here.

Figure 6:
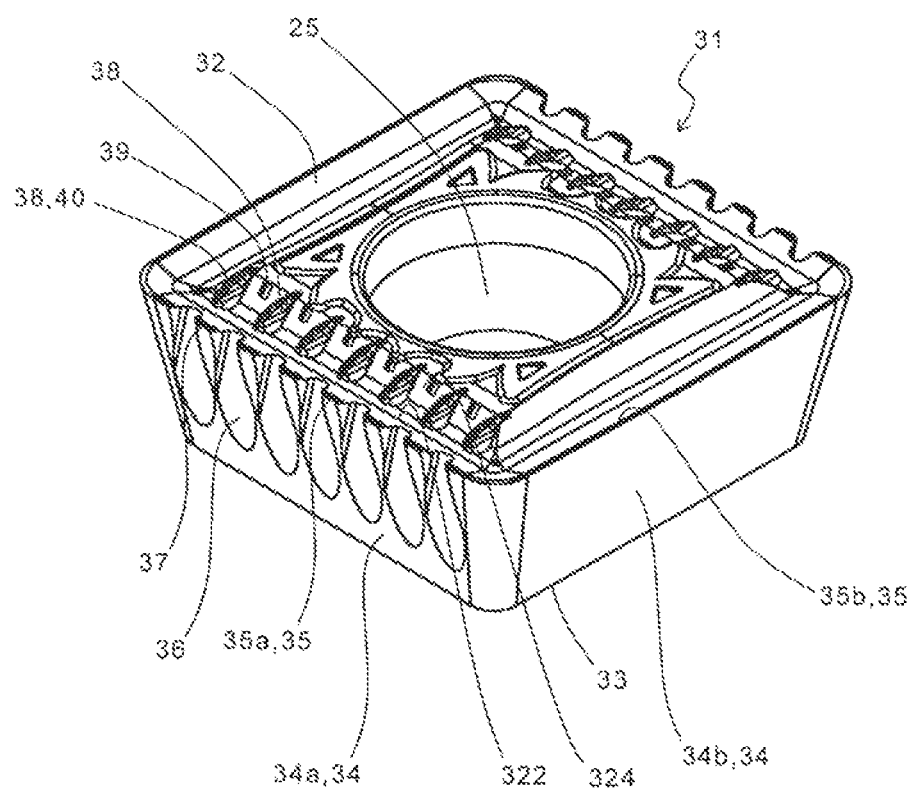
FIG. 6 is a perspective view showing a cutting insert according to a second embodiment of the present invention.
Figure 7:
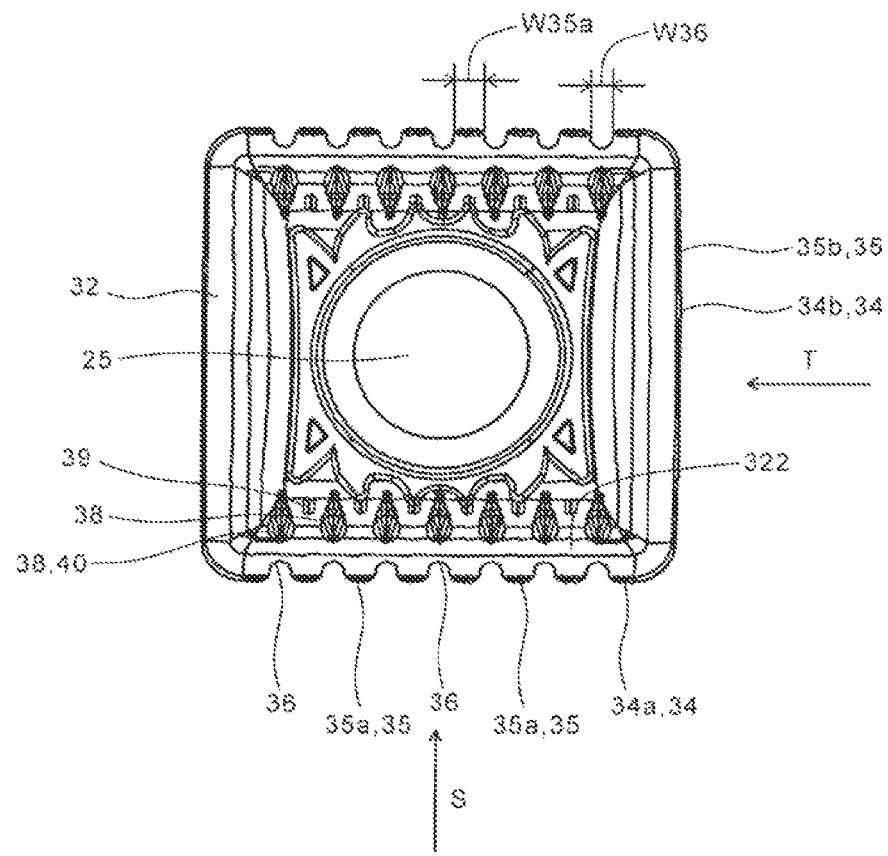
FIG. 7(a) is a top view of the cutting insert shown in FIG. 6.
FIG. 7(b) is a partially enlarged view of a flat region continuous with a divided cutting edge in FIG. 7(a)
Figure 7:
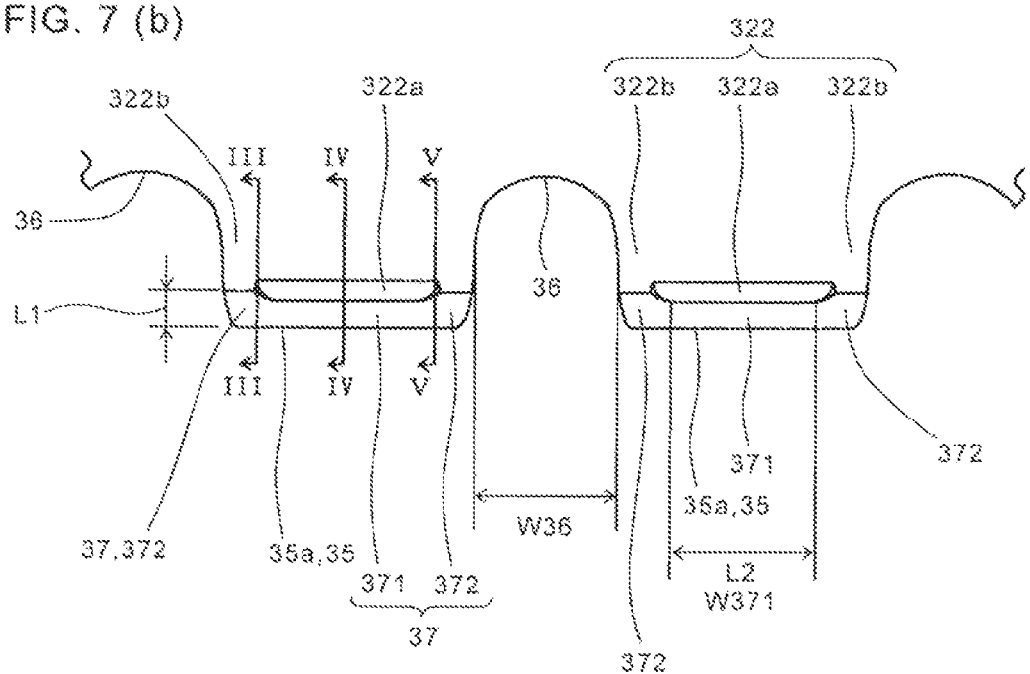

As shown in FIGS. 6 and 7, the insert 31 of the present embodiment includes a body having an upper surface 32, a lower surface 33, and a side surface 34. In the present embodiment, the body has a rectangular shape having four long sides of equal length and four corners.

Figure 8:
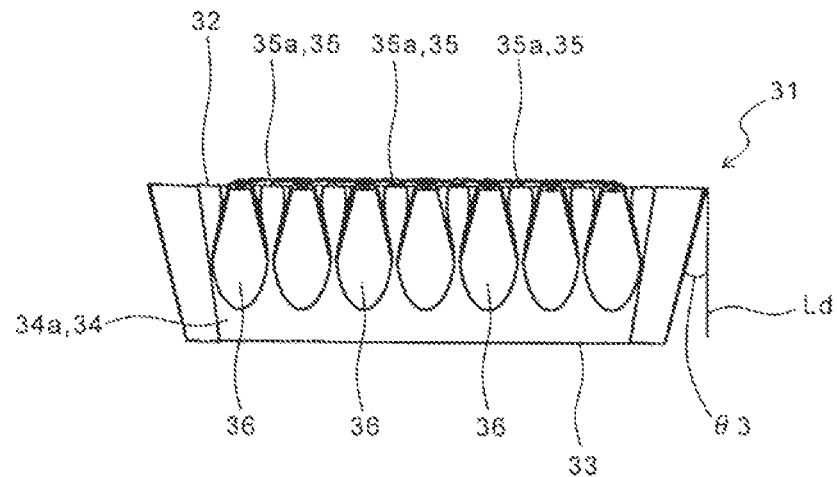
FIG. 8 is a side view when the cutting insert shown in FIG. 7(a) is viewed from a direction of arrow S.
Figure 9:
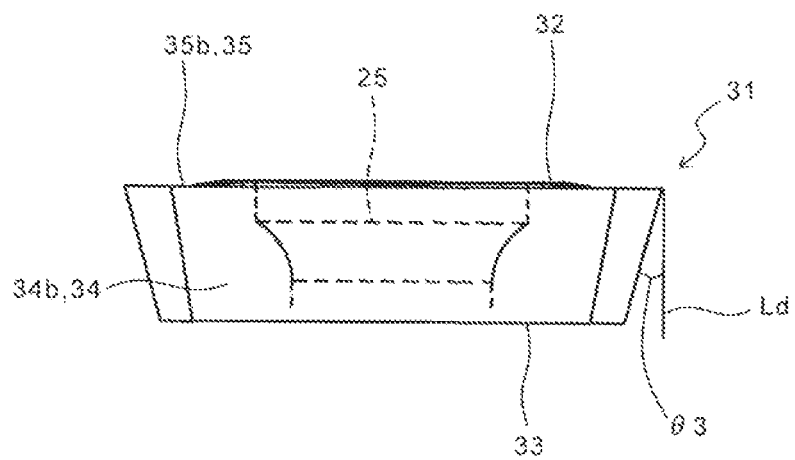
FIG. 9 is a side view when the cutting insert shown in FIG. 7(a) is viewed from a direction of arrow T.
Figure 10:
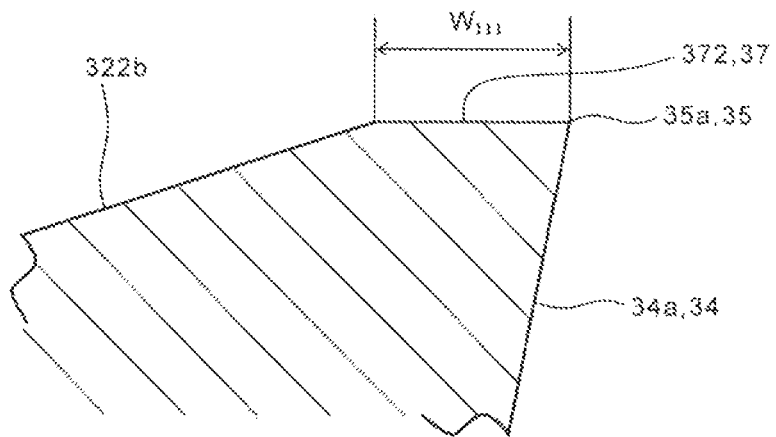
FIG. 10(a) is a diagram showing an enlarged broken-out section taken along the line of FIG. 7(b)
FIG. 10(b) is a diagram showing an enlarged broken-out section taken along the line IV-IV of FIG. 7(b)
FIG. 10(c) is a diagram showing an enlarged broken-out section taken along the line V-V of FIG. 7(b)
Figure 10:
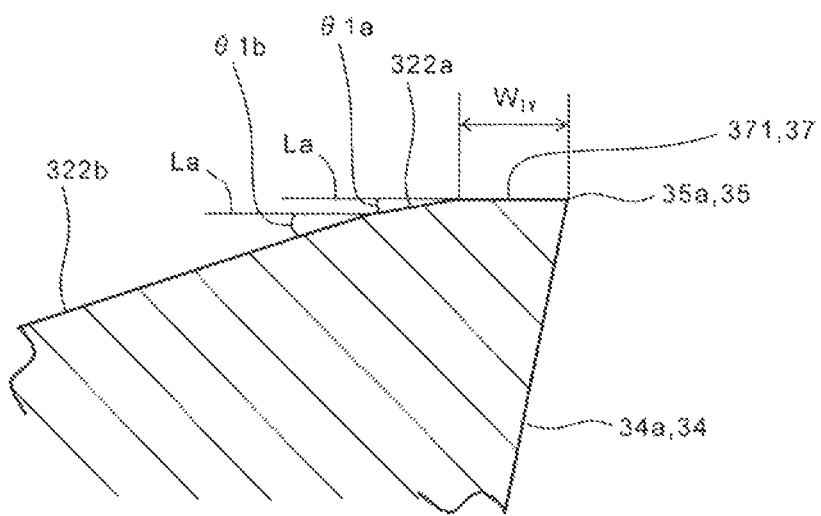
Figure 10:
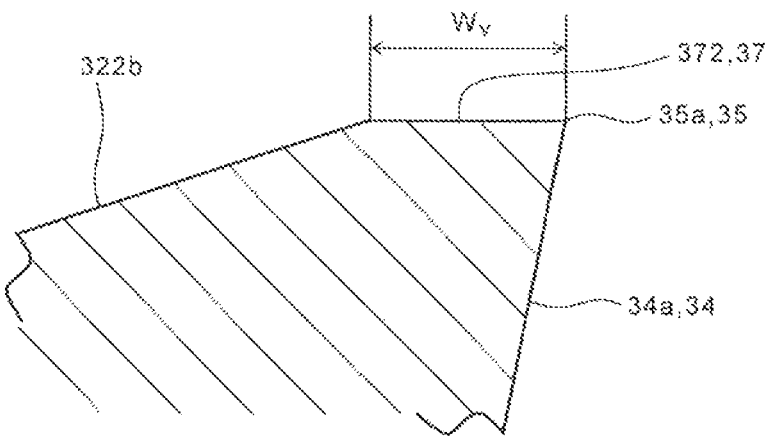

The insert 31 is a so-called positive type insert in which a cutting edge 35 is located at an intersection region of the upper surface 32 and the side surface 34, and a positive clearance angle θ3 is applied to the side surface 34, as shown in FIGS. 8 and 9. In the present embodiment, the clearance angle θ3 is constant in a region along the cutting edge 35.

The side surface 34 includes a groove-shaped concave part 36. The side surface 34 may include the concave part 36 formed on at least one surface thereof. In the present embodiment, there are a first side surface 34a having the concave part 36 formed thereon, and a second side surface 34b that is adjacent to the first side surface 34a and has no concave part 36. The first side surface 34a and the second side surface 34b are alternately formed and intersectedly arranged.

One end of the concave part 36 reaches the upper surface 32, and the concave part 36 is located to divide the cutting edge 35 into a plurality of divided cutting edges 35a. In the present embodiment, as shown in FIGS. 6 and 7, the single cutting edge 35 is divided into the eight divided cutting edges 35a by the seven concave parts 36. In the present specification, the cutting edge 35 not divided by the concave part 36 is referred to as an undivided cutting edge 35b for the sake of distinguishing it from the divided cutting edges 35a. Specifically, the undivided cutting edge 35b is made up of a linear part and curved parts located at both ends of the linear part.

Each of the concave parts 36 is formed into a concave shape that opens outward in a top view, as shown in FIG. 7(a). In the present embodiment, from the viewpoint of reducing strength deterioration of the insert 31, the other end of the concave part 36 is configured not to reach the lower surface 33 in a side view, as shown in FIG. 8. Additionally, from the viewpoint of maintaining the strength of the insert 31, a width W35a of the divided cutting edge 35a and a width W36 of the concave part 36 preferably have an inequality relationship of W35a>W36, as shown in FIG. 7(a).

The insert 31 is capable of producing a similar effect to that of the insert 1 according to the foregoing first embodiment by having the plurality of divided cutting edges 35a. Particularly in the insert 31, no concave part is formed on the second side surface 34b adjacent to the first side surface 34a, thereby reducing the probability that during the cutting with the divided cutting edges 35a, chips are caught in the concave parts formed on the adjacent side surfaces, and the chips impair the insert, the holder, or the machined surface. The chips generated by the undivided cutting edge 35b are wider than the concave parts 36, and are thus less likely to be caught in the concave parts 36.

As shown in FIG. 6, the upper surface 32 includes a flat region 37 which is continuous with the cutting edge 35 and extends along the cutting edge 35, and a rake surface 322 extending inward from the flat region 37 along the cutting edge 35 (the divided cutting edge 35a and the undivided cutting edge 35b). The rake surface 322 is located to come closer to the lower surface 33 as departing from the cutting edge 35, from the viewpoint of decreasing cutting resistance. In the present specification, the sentence "the flat region 37 continuous with the cutting edge 35" denotes a portion having the smallest distance from the cutting edge 35 among portions continuous with the cutting edge 35. In the present specification, the phrase "the distance from the cutting edge 35" is prescribed by a distance perpendicular to the linear part of the cutting edge 35.

The flat region 37 is located along the cutting edge 35 in order to reduce fracture of the cutting edge 35. In the present embodiment, as shown in FIG. 7(b), the flat region 37 is continuous with the divided cutting edges 35a in which a distance L1 in a direction away from the divided cutting edges 35a decreases as going from both ends of the divided cutting edges 35a to the midportion thereof. Therefore, for example, when a certain region remaining uncut is cut by the divided cutting edges, the cutting resistance can be decreased, and the vibration of the cutting insert can be reduced by decreasing a contact area between the cutting edge and the workpiece at the midportion of the divided cutting edges. This reduces the cutting edge fracture and decreases machined surface roughness. Alternatively, the flat region 37 may include a first region 371 having the smallest distance L1 in a direction away from the divided cutting edges 35a, and a second region 372 in the rest area except for the first region. The second region 372 may include a region in which the distance L1 in the direction away from the divided cutting edges 35a is constant.

FIGS. 10(a) and 10(c) show distances $W_{III}$ and $W_V$ from the divided cutting edge 35a in the second region 372, and FIG. 10(b) shows a distance $W_{IV}$ from the divided cutting edge 35a in the first region 371. Accordingly, it can be seen that $W_{III} > W_{IV}$, and $W_V > W_{IV}$. Owing to this configuration, the cutting resistance at the midportion of the divided cutting edge 35a subjected to the largest cutting resistance can be decreased compared to that in the end portions of the divided cutting edges 35a, and the midportion is unsusceptible to vibration. It is therefore capable of reducing the probability that the machined surface roughness increases by the workpiece movement or the insert fracture due to the vibration. In the present specification, the phrase "the distance L1 in the direction away from the cutting edge 35" is prescribed by a distance in a direction which is perpendicular to the cutting edge 35, and is headed inwardly of the insert 31.

In order to further decrease the cutting resistance at the midportion of the divided cutting edge 35a, the first region 371 preferably have a constant distance L1 in the direction away from the divided cutting edge 35a. Also, in order to reduce fracture at the end portion of the divided cutting edge 35a, the second regions 372 are preferably located at both sides of the first region 371, and have a constant distance L1 in the direction away from the divided cutting edge 35a. Here, in the first region 371, a distance L2 in a direction along the divided cutting edge 35a is preferably larger than a width of the concave part 36. In the present embodiment, as shown in FIG. 7(b), W371>W36, where W371 is a distance L2 in the direction along the divided cutting edge 35a of the first region 371, and W36 is a width of the concave part 36.

Furthermore, in the present embodiment, a rake angle θ1a of a first rake surface 322a corresponding to the first region 371 is smaller than a rake angle θ1b of a second rake surface 322b corresponding to the second region 372, as shown in FIG. 10(b). That is, θ1a<θ1b. This configuration enhances the strength of the cutting edge 35.

In the present specification, the phrase "a surface corresponding to a region" denotes a partial region of a surface overlapped with a region surrounded by extension lines of end portions of a region in a direction perpendicular to the cutting edge at a position at which a distance in the cutting edge direction between the end portions of the region in a top view. In the present embodiment, the first rake surface 322a is located inwardly of the first region 371, and the second rake surface 322b is located inwardly of the second region 372.

As shown in FIG. 6, the upper surface 32 includes a rising surface 324 which is located inward compared to the rake surface 322, and is inclined to be farther away from the lower surface 33 as departing from the cutting edge 35. The rising surface 324 is inclined to be farther away from the lower surface 33 as going inward. The rising surface 324 is located opposite the divided cutting edge 35a. Owing to this configuration, the rising surface 324 stably further curls the chips generated by the divided cutting edge 35a and curled along the rake surface 322, and also divides the chips in a length direction thereof.

In the insert 31, the upper surface 32 also includes a first raised part 38 located inwardly of the concave part 36, and a second raised part 39 located inwardly of the divided cutting edge 35a. Therefore, similarly to the insert 1 according to the foregoing first embodiment, the insert 31 produces an effect obtainable from the specific first raised part 38 and second raised part 39. In the present embodiment, the first raised part 38 is located in the upper surface 32 and at an extension region through which the concave part 36 passes when it is extended in a longitudinal direction thereof. The second raised part 39 is located in the vicinity of an inward-side end portion of the rising surface 324.

In the present embodiment, the first raised part 38 is located at a higher position than the divided cutting edge 35a. This further reduces collisions between the chips. Also in the present embodiment, the first raised part 38 is located across the rake surface 322 and the rising surface 324. This configuration further surely reduces lateral vibration of the chips.

The upper surface 32 further has a third raised part 40 on a bisector of an angle formed by a virtual extension line of the divided cutting edge 35a and a virtual extension line of the undivided cutting edge 35b. The third raised part 40 is located for the purpose of reducing the probability that the chips generated from the divided cutting edge 35a move to the undivided cutting edge 35b. In the present embodiment, the first raised part 38 closest to the second side surface 34b substitutes for the third raised part 40. Thus, the third raised part 40 may be integrated with the first raised part 38 within a range in which the effect of the present embodiment is not harmed.

Other configurations are similar to those of the insert 1 of the first embodiment, and therefore the description thereof is omitted here.

As described above, the present embodiment produces the foregoing effects because the upper surface further includes the plurality of flat regions being respectively continuous with the plurality of divided cutting edges in which the distance L1 in the direction away from each of the divided cutting edges decreases as going from both ends of each of the divided cutting edges to the midportion thereof. No special limitation is imposed on other configurations. The present embodiment may suitably employ any configuration different from that of the insert 1 of the first embodiment.

(Third Embodiment)

Figure 11:
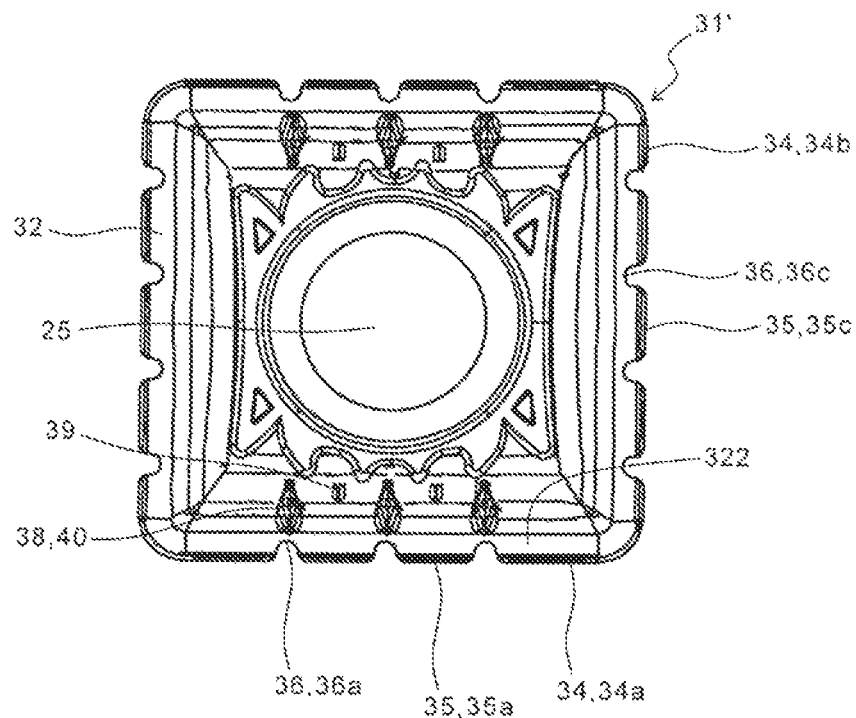
FIG. 11(a) is a top view showing a cutting insert according to a third embodiment of the present invention.
FIG. 11(b) is a partially enlarged view of a divided cutting edge 35a and a divided cutting edge 35c.
Figure 11:
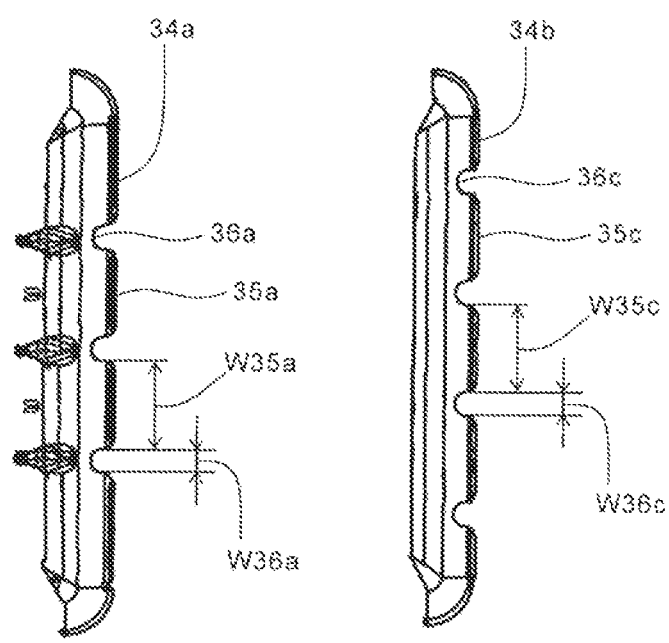
Figure 12:
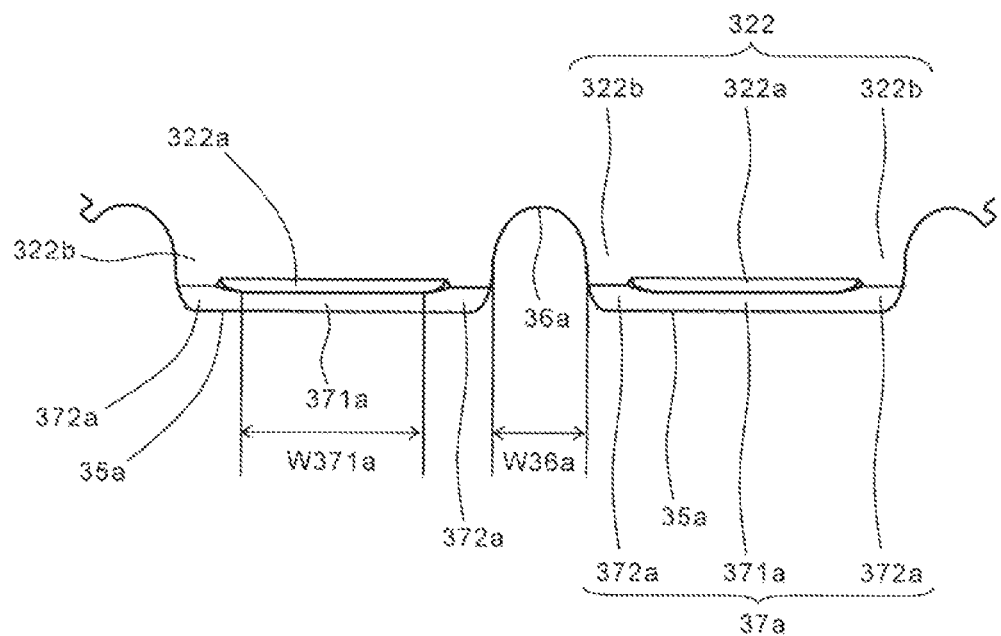
FIG. 12(a) is a partially enlarged view of a flat region continuous with the divided cutting edge 35a shown in FIG. 11(b)
FIG. 12(b) is a partially enlarged view of a flat region continuous with the divided cutting edge 35c.
Figure 12:
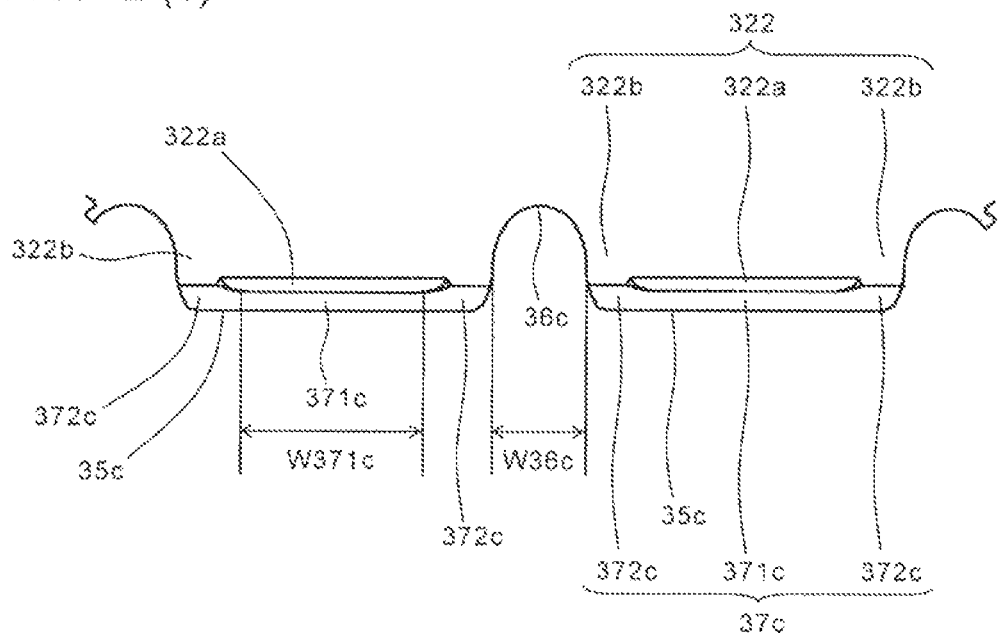

An insert according to a third embodiment of the present invention is described in detail with reference to FIGS. 11 and 12. In FIGS. 11 and 12, the same components as the foregoing FIGS. 1 to 10 are identified by the same reference numerals, and the description thereof is omitted here.

As shown in FIG. 11(a), in the insert 31' of the present embodiment, concave parts 36 are formed over the entire surface of a side surface 34. A plurality of divided cutting edges 35a are formed on a first side surface 34a, and a plurality of divided cutting edges 35c are formed on a second side surface 34b.

In the present embodiment, three concave parts 36a are formed on the first side surface 4a, and four concave parts 36c are formed on the second side surface 34b. Accordingly, a cutting edge 35 formed at an intersection region of the first side surface 34a and an upper surface 32 is divided into four divided cutting edges 35a. A cutting edge 35 formed at an intersection region of the second side surface 34b and the upper surface 32 is divided into five divided cutting edges 35c.

From the viewpoint of maintaining the strength of the insert 31', a width W35a of the divided cutting edge 35a and a width W36a of the concave part 36a preferably have a relationship of W35a>W36a, and a width W35c of the divided cutting edge 35c and a width W36c of the concave part 36c preferably have a relationship of W35c>W36c, as shown in FIG. 11(b).

Also, as shown in FIG. 11(b), the divided cutting edges 35a formed on the first side surface 34a and the concave parts 36c formed on the second side surface 34b correspond to one another, and the divided cutting edges 35c formed on the second side surface 34b and the concave parts 36a formed on the first side surface 34a correspond to one another. In the present specification, the sentence "the concave parts correspond to the divided cutting edges" denotes that when the two cutting inserts 31' are arranged so that the first side surface 34a and the second side surface 34b are opposed to each other, and extension lines of cutting edges formed at an intersection region of a side surface adjacent to the opposed side surface coincide with each other, in a top view, at least some of the concave parts is located on a virtual straight line which passes through a midportion of each divided cutting edge in the width direction thereof, and follows an extension direction of the divided cutting edge.

As shown in FIG. 12, flat regions 37a and 37c are formed continuously with the divided cutting edges 35a and 35c, respectively. As shown in FIG. 12(a), the flat region 37a has a first region 371a at a midportion thereof, and a second region 372a at both ends thereof. A distance W371a in a direction along the divided cutting edge 35a of the first region 371a is preferably larger than a width W36c of the concave part 36c.

As shown in FIG. 12(b), the flat region 37c has a first region 371c at a midportion thereof, and second regions 372c at both ends thereof. A distance W371c in a direction along the divided cutting edge 35c of the first region 371c is preferably larger than a width W36a of the concave part 36a.

Other configurations are similar to those of the inserts 1 and 31 of the first and second embodiments, and therefore the description thereof is omitted here.

Similarly to the insert 31 of the second embodiment, the present embodiment also produces the foregoing effects because the upper surface further includes the plurality of flat regions being respectively continuous with the plurality of divided cutting edges in which the distance L1 in the direction away from each of the divided cutting edges decreases as going from both ends of each of the divided cutting edges to the midportion thereof. No special limitation is imposed on Other configurations. The present embodiment may suitably employ any configuration different from those of the inserts 1 and 31 of the first and second-embodiments.

(Fourth Embodiment)

An insert according to a fourth embodiment of the present invention is described in detail with reference to FIGS. 13 to 18. In FIGS. 13 to 18, the same components as the foregoing FIGS. 1 to 12 are identified by the same reference numerals, and the description thereof is omitted here.

Figure 13:
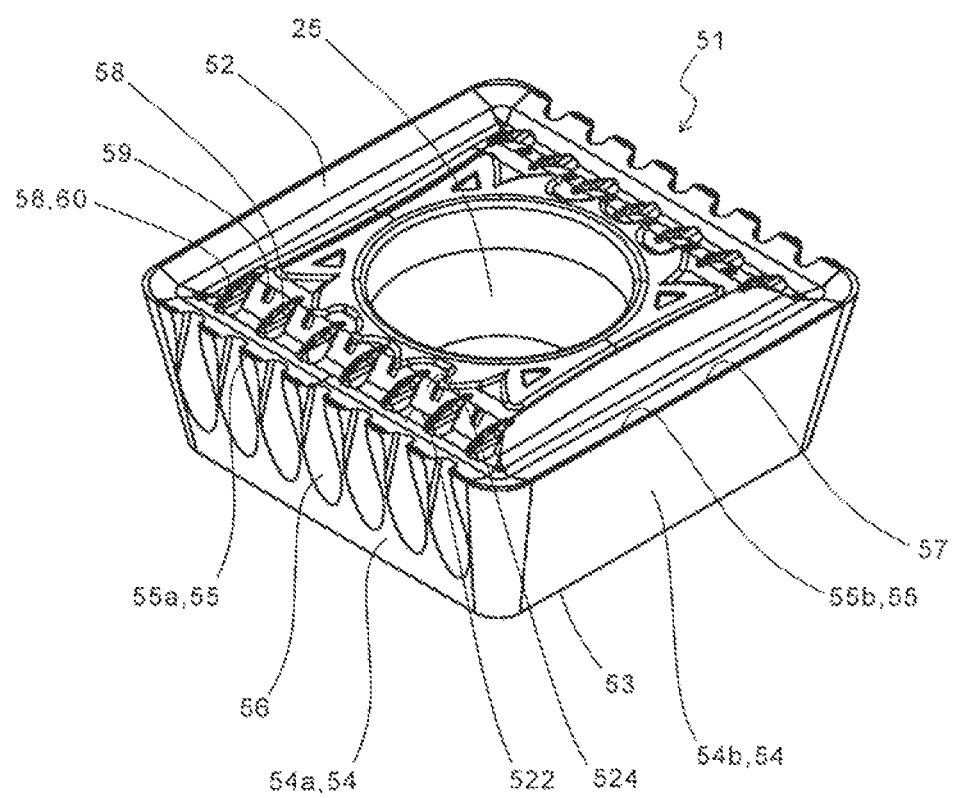
FIG. 13 is a perspective view showing a cutting insert according to a fourth embodiment of the present invention.
Figure 14:
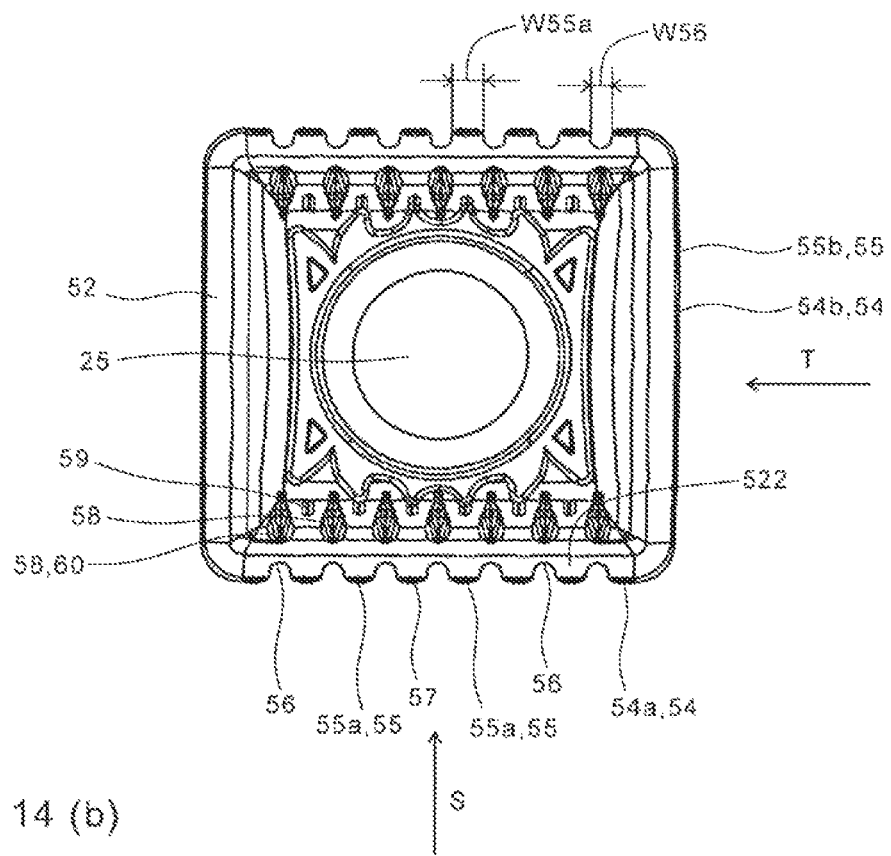
FIG. 14(a) is a top view of the cutting insert shown in FIG. 13.
FIG. 14(b) is a partially enlarged view of a flat region in FIG. 14(a)
Figure 14:
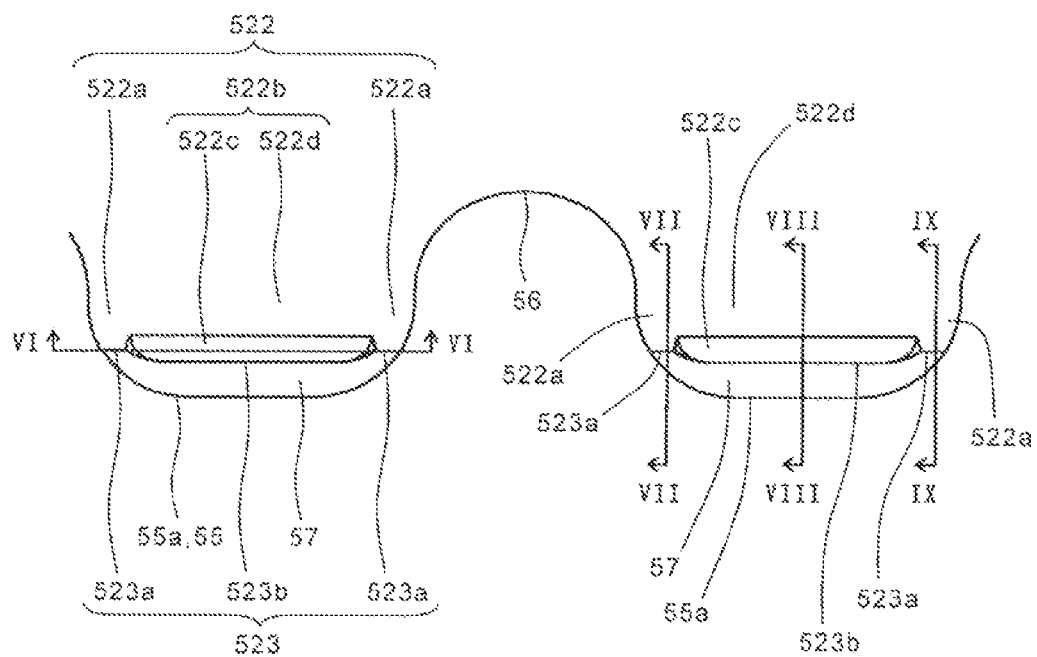

As shown in FIGS. 13 and 14, the insert 51 of the present embodiment includes a body having an upper surface 52, a lower surface 53, and a side surface 54. In the present embodiment, the body has a rectangular shape having four long sides of equal length and four corners.

Figure 15:
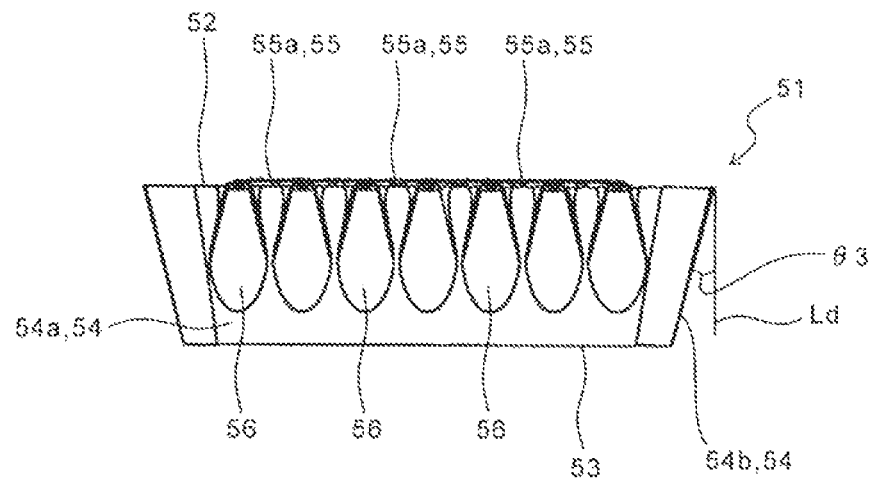
FIG. 15 is a side view when the cutting insert shown in FIG. 14(a) is viewed from a direction of arrow S.
Figure 16:
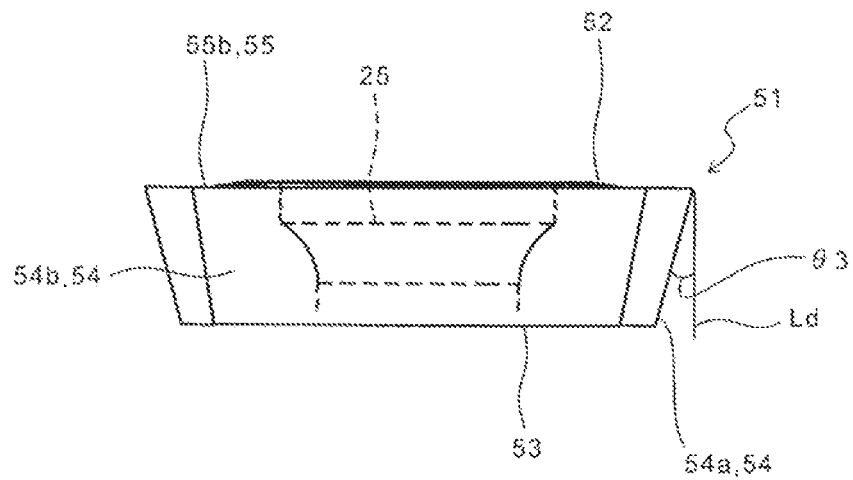
FIG. 16 is a side view when the cutting insert shown in FIG. 14(a) is viewed from a direction of arrow T.

The insert 51 is a so-called positive type insert in which a cutting edge 55 is located at an intersection region of the upper surface 52 and the side surface 54, and a positive clearance angle θ3 is applied to the side surface 54, as shown in FIGS. 15 and 16. In the present embodiment, the clearance angle θ3 is constant in a region along the cutting edge 55.

A concave part 56 is located on at least one surface of the side surface 54. In the present embodiment, there are a first side surface 54a having the concave part 56 located thereon, and a second side surface 54b that is adjacent to the first side surface 54a and has no concave part 56. The first side surface 54a and the second side surface 54b are alternately formed.

One end of the concave part 56 reaches the upper surface 52, and the concave part 56 is located to divide the cutting edge 55 into a plurality of divided cutting edges 55a. In the present embodiment, as shown in FIGS. 13 and 14, the single cutting edge 55 is divided into the eight divided cutting edges 55a by the seven concave parts 56.

Each of the concave parts 56 is formed into a concave shape that opens outward in a top view, as shown in FIG. 19(a). In the present embodiment, from the viewpoint of reducing strength deterioration of the insert 51, the other end of the concave part 56 is configured not to reach the lower surface 53 in a side view, as shown in FIG. 15. Additionally, from the viewpoint of maintaining the strength of the insert 51, width W55a of the divided cutting edge 55a and a width W56 of the concave part 56 preferably have an inequality relationship of W55a>W56, as shown in FIG. 14(a).

The insert 51 is capable of producing a similar effect to that of the insert 1 according to the foregoing first embodiment by having the plurality of divided cutting edges 55a. The insert 51 is also capable of producing a similar effect to that of the insert 31 according to the foregoing second embodiment owing to the fact that no concave part is formed on the second side surface 54b adjacent to the first side surface 54a.

As shown in FIG. 14(b), the upper surface 52 includes a flat region 57 (flat surface) located inwardly of the divided cutting edges 55a, and a rake surface 522 (inclined surface) which is located inwardly of the flat region 57, and comes closer to the lower surface 53 as departing from the flat region 57. In the present embodiment, the term "inward" denotes a direction which is perpendicular to a linear part of the divided cutting edge 55a, and is located close to a midportion of the body with reference to the divided cutting edge 55a.

The flat region 57 is located along the cutting edge 55 in order to reduce fracture of the cutting edge 55. The rake surface 522 is inclined to come closer to the lower surface 53 as departing from the divided cutting edge 55a, from the viewpoint of decreasing cutting resistance. This allows the chips generated by the divided cutting edge 6a to be curled along the rake surface 522. The rake surface 522 may be made up of a single surface or a plurality of surfaces.

A boundary region 523 of the flat region 57 and the rake surface 522 includes two first boundary regions 523a located close to both ends of the boundary region 523, and a second boundary region 523b located closer to the divided cutting edge 55a than the first boundary regions 523a in a top view. Owing to this configuration, the cutting resistance can be decreased at the midportion of the divided cutting edge 55a subjected to the largest cutting resistance.

Figure 17:
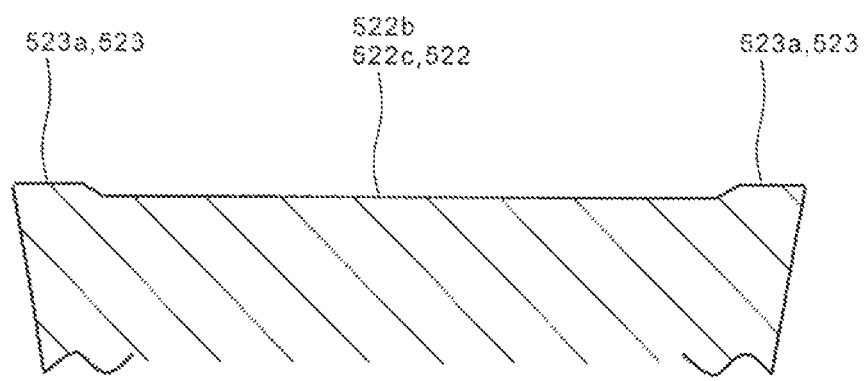
FIG. 17 is a diagram showing an enlarged broken-out section taken along the line VI-VI of FIG. 14(b)
Figure 18:
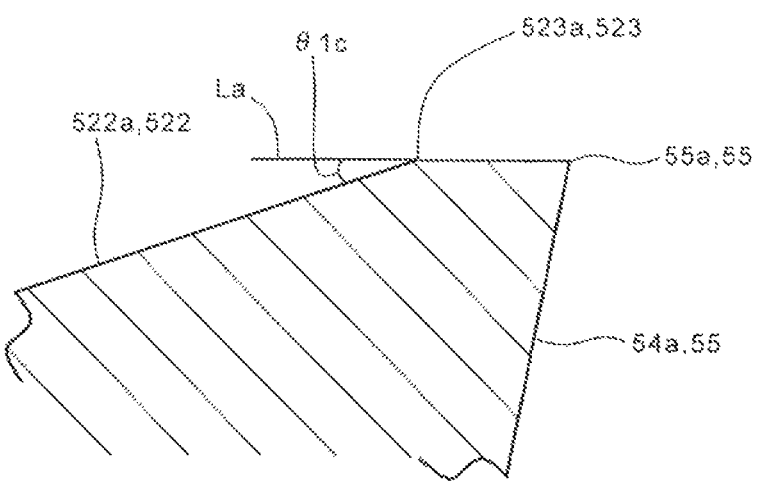
FIG. 18(a) is a diagram showing an enlarged broken-out section taken along the line VII-VII of FIG. 14(b)
FIG. 18(b) is a diagram showing an enlarged broken-out section taken along the line VIII-VIII of FIG. 14(b)
FIG. 18(c) is a diagram showing an enlarged broken-out section taken along the line IX-IX of FIG. 14(b)
Figure 18:
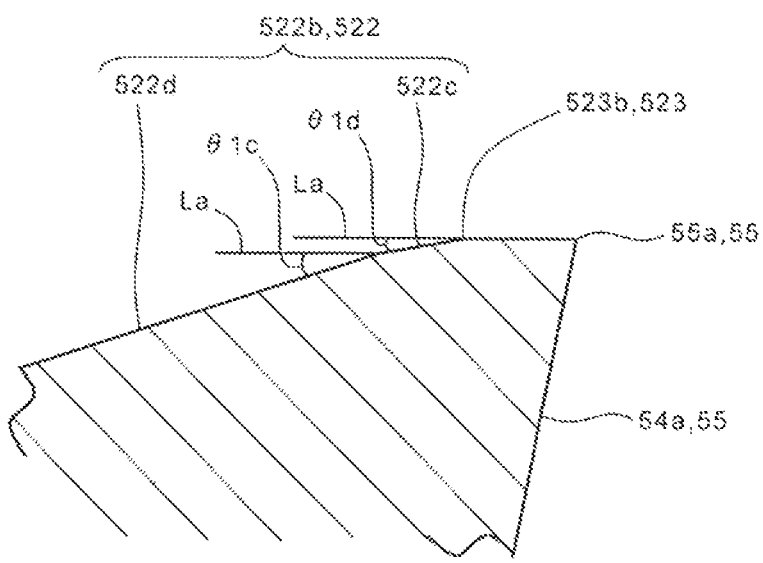
Figure 18:
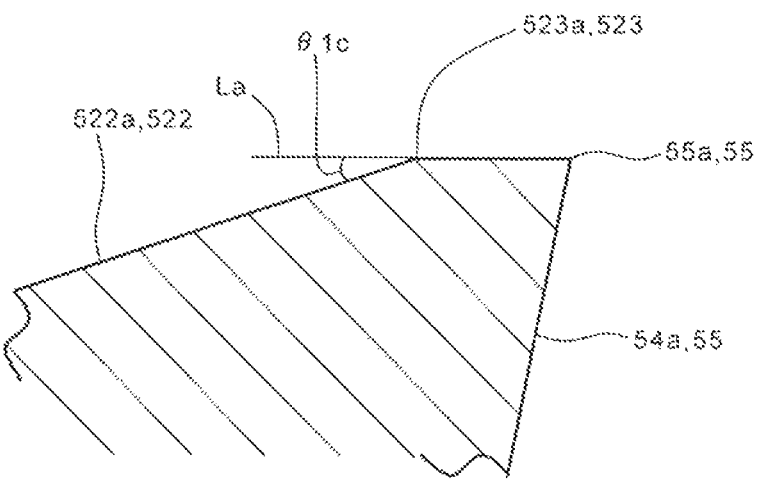

As shown in FIGS. 14(b), 17, and 18, the rake surface 522 includes a third rake surface 522a (first inclined surface) located inwardly of the first boundary regions 523a, and a fourth rake surface 522b (second inclined surface) located inwardly of the second boundary region 523b. The first boundary regions 523a are located at a higher position than the fourth rake surface 522b. Owing to this configuration, when the chips generated by the divided cutting edge 55a pass through the fourth rake surface 522b, the chips are narrowed down in the width direction thereof by the first boundary regions 523a located at both sides of the fourth rake surface 522b. Consequently, the chips stably move forward, thereby reducing the probability that the chips are caught in the concave parts 56 or the chips collide with each other. This improves the chip discharge performance.

As shown in FIG. 17, the fourth rake surface 522b preferably has a concave shape in a cross-sectional view including the two first boundary regions 523a. This further surely narrows down the cross section of the chips.

In the present embodiment, a rake angle of the fourth rake surface 522b is not more than a rake angle of the third rake surface 522a (that is, an inclination angle of the second inclined surface is not more than an inclination angle of the first inclined surface). In FIGS. 18(a) to 18(c), a rake angle θ1c of the third rake surface 522a and a rake angle θ1d of the fourth rake surface 522b have a relationship of θ1c≥θ1d from the viewpoint of maintaining the strength of the insert 51.

In the present embodiment, the fourth rake surface 522b is made up of a plurality of surfaces. Specifically, as shown in FIG. 18(b), the fourth rake surface 522b is made up of a fifth rake surface 522c (third inclined surface) and a sixth rake surface 522d (fourth inclined surface). The sixth rake surface 522d has the same rake angle θ1c as the third rake surface 522a. This configuration reduces strength deterioration of the divided cutting edges 55a.

As shown in FIG. 13, the upper surface 52 may include a rising surface 524 which is located inward compared to the rake surface 522, and is inclined to be farther away from the lower surface 53 as departing from the cutting edge 55. Owing to this configuration, the rising surface 524 stably further curls the chips generated by the divided cutting edge 55a and curled along the rake surface 522, and also divides the chips in a length direction thereof.

In the insert 51, the upper surface 52 includes a first raised part 58 located inwardly of the concave part 56, and a second raised part 59 located inwardly of the divided cutting edge 55a. Hence, similarly to the insert 1 according to the foregoing first embodiment, the insert 51 produces the effect obtainable from the specific first raised part 58 and second raised part 59. In the present embodiment, the first raised part 58 is located in the upper surface 52 and at an extension region through which the concave part 56 passes when it is extended in the longitudinal direction thereof. The second raised part 59 is located in the vicinity of an inward-side end portion of the rising surface 524. This configuration reduces the probability that the chips ride over the rising surface 524 and are caught in the holder.

In the present embodiment, the first raised part 58 is located at a higher position than the divided cutting edge 55a, and is located across the rake surface 522 and the rising surface 524. Hence, similarly to the foregoing second embodiment, the collision between the chips can be further reduced, and lateral vibration of the chips can be further surely reduced.

In the present embodiment, as shown in FIG. 14(a), the upper surface 52 includes the plurality of first raised parts 58, and they are arranged so that a length of the second boundary region 523b does not exceed a distance between the adjacent first raised parts 58. This configuration further stabilizes the chip discharge performance, and reduces the chips caught in the concave parts 56 and the collision between the chips.

For a similar reason to that described in the foregoing second embodiment, the upper surface 52 may include a third raised part 60 on a bisector of an angle formed by a virtual extension line of the divided cutting edge 55a and a virtual extension line of an undivided cutting edge 55b. In the present embodiment, the first raised part 58 closest to the second side surface 54b substitutes for the third raised part 60, as shown in FIG. 14(a).

Other configurations are similar to those of the insert 1 of the first embodiment, and therefore the description thereof is omitted here.

As described above, the present embodiment produces the foregoing effects because the boundary region of each flat region and each rake surface includes the two first boundary regions located close to both ends in the boundary region, and the second boundary region located between the two first boundary regions and located closer to the divided cutting edges than the first boundary regions; and the plurality of rake surfaces include the third rake surface located inwardly of the first boundary regions, and the fourth rake surface located inwardly of the second boundary region; and the first boundary regions are located at a higher position than the fourth rake surface. No special limitation is imposed on other configurations. The present embodiment may suitably employ any configuration different from those of the inserts 1, 31, and 31' of the first, second, and third embodiments.

<Cutting Tool>
(First Embodiment)

Next, a cutting tool according to a first embodiment of the present invention is described in detail with reference to FIG. 19.

Figure 19:
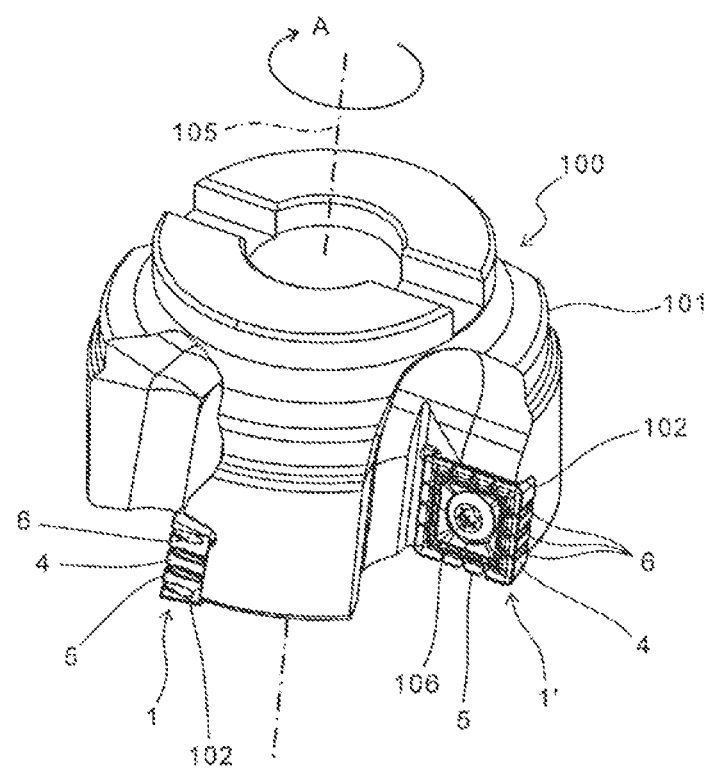
FIG. 19 is a perspective view showing a cutting tool according to a first embodiment of the present invention.

As shown in FIG. 19, the cutting tool 100 of the present embodiment is a face milling cutter, and includes the cutting insert 1 according to the foregoing first embodiment, and a holder 101 configured to attach the insert 1 to a front end thereof.

In the cutting tool 100, the insert 1' is also attached to the holder 101, in addition to the insert 1. In the insert 1', the three concave parts 6 are formed on the side surface 4. The shape of the individual concave parts 6 is identical to the shape of the second concave part 62 having the other end 62a on the lower surface 3 as described in the insert 1. Other configurations are similar to those of the insert 1.

On the other hand, the holder 101 has a rotor shape around a central axis 105, and has a plurality of insert pockets 102. The individual insert pockets 102 are formed at predetermined spatial intervals in the circumferential direction on an outer periphery at the front end of the holder 101 in a direction along the central axis 105 of the holder 101. In the present embodiment, the four insert pockets 102 are located at substantially equal intervals, and the individual insert pockets 102 open to an outer peripheral surface and a front end surface of the holder 101.

Unshown insert attachment seats (hereinafter referred to as "seats") are formed on the downstream side in a rotation direction indicated by arrow A in the individual insert pockets 102. The inserts 1 and 1' are detachably attached to the seats. The attachment of the inserts 1 and 1' is carried out by respectively inserting attachment screws 106 into through holes 25 of the inserts 1 and 1', and then by screwing the front ends of the attachment screws 106 into unshown screw holes formed in the seats. For reducing fracture of the holder 101, the inserts 1 and 1' may be attached to the seats with various types of known sheet members interposed therebetween.

The cutting processing with the cutting tool 100 is carried by rotating the holder 101 in a direction of arrow A around the central axis 105, and by bringing the cutting edges 5 of the inserts 1 and 1' into contact with a surface of a workpiece. In the cutting tool 100, the inserts 1 and 1' are alternately attached in a circumferential direction of the holder 101 in an arrangement allowing a certain region remaining uncut by one of the inserts to be cut by the other insert.

That is, the plurality of concave parts 6 are formed on the side surfaces 4 of the inserts 1 and 1'. Therefore, a certain region of the workpiece which corresponds to the concave parts 6 remains uncut, and a convex-shaped uncut region is left on a machined wall surface of the workpiece. Hence, in the cutting tool 100, the inserts 1 and 1' are alternately attached to the seats located on the same circumference of the holder 101 so that the inserts 1 and 1' have different arrangements of the concave parts 6. This permits the cutting processing while smoothing the machined wall surface of the workpiece.

(Second Embodiment)

Next, a cutting tool according to a second embodiment of the present invention is described in detail.

The cutting tool of the present embodiment uses the holder 101 of the cutting tool 100 according to the foregoing first embodiment. In the cutting tool of the present embodiment, the inserts 31 and 31' according to the foregoing second and third embodiments are attached to a plurality of insert pockets 102 located in the holder 101.

A plurality of inserts 31 and 31' are attached so that the cutting edges 35 protrude outward from an outer peripheral surface of the holder 101. At this time, all of the plurality of inserts 31 and 31' are attached so that the divided cutting edges protrude from the insert pockets 102, and the concave parts of certain inserts 31 and inserts 31' correspond to the divided cutting edges of the inserts 31 and 31' adjacent thereto.

That is, in the inserts 31 and 31' located behind in a rotation direction of the holder 101, the divided cutting edges are located correspondingly to the concave parts of the inserts 31 and 31' located ahead. Similarly to the foregoing first embodiment, this configuration causes a convex-shaped uncut region due to the concave parts to be left on a machined surface processed by the divided cutting edges. However, the convex-shaped uncut region can be cut by the cutting edges behind the rotation direction, thereby obtaining a step-free flat machined surface.

First and second inserts constructed from the inserts 31 according to the foregoing second embodiment may be alternately attached to a holder 51 so that at least one concave part 36 of the second insert is arranged overlappingly with the plurality of divided cutting edges 35a of the first insert in a view along the same circumference of the holder 101. This configuration allows the divided cutting edges 35a of the second insert to cut the region remaining uncut by the first insert, thereby obtaining a step-free flat machined surface. Here, in a first region 371 in the flat region 37 of the first insert, a distance L2 in a direction along the divided cutting edges 35a of the first insert is not less than a width of the concave part 36 of the second insert.

In the present embodiment, the inserts 31 and 31' are attached to the holder 101 so that the cutting edges protruding outward from an outer peripheral surface of the holder 101 have a positive axial rake angle with respect to the holder 101. That is, the cutting edges 35 of the inserts 31 and 31' located close to the outer peripheral surface of the holder 101 are inclined to be further away from the central axis 105 of the holder 101 as going from the front end to the rear end in a side view. This configuration decreases cutting resistance exerted during cutting. This configuration is also applicable to the cutting tools according to other embodiments.

Other configurations are similar to those of the cutting tool 100 of the first embodiment, and therefore the description thereof is omitted here.

(Third Embodiment)

Next, a cutting tool according to a third embodiment of the present invention is described in detail.

The cutting tool of the present embodiment uses the holder 101 of the cutting tool 100 according to the foregoing first embodiment. The inserts 51 according to the foregoing fourth embodiment are attached to a plurality of insert pockets 102 located in the holder 101.

The plurality of inserts 51 are attached so that the cutting edges 55 protrude outward from an outer peripheral surface of the holder 101. At this time, it is preferable to alternately dispose the inserts 51 attached so that the divided cutting edges 55a protrude from the outer peripheral surface of the holder 101, and the inserts 51 attached so that the undivided cutting edge 55b protrude from the outer peripheral surface of the holder 101.

A convex-shaped region that remains uncut is left on a machined surface processed by the divided cutting edges 55a. In the present embodiment, the inserts 51 in which the undivided cutting edge 55b protrude outward are located behind in a rotation direction of the holder 101. Therefore, the remaining convex-shaped uncut region on a machined surface can be surely cut, thereby obtaining a step-free more flat machined surface.

Other configurations are similar to those of the cutting tool 100 of the first embodiment and the cutting tool of the second embodiment, and therefore the description thereof is omitted here.

<Method of Manufacturing Machined Product>

Figure 20:
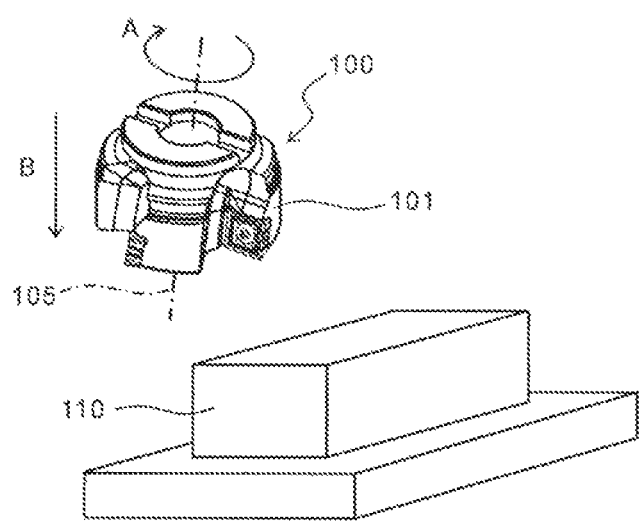
FIGS. 20(a) to 20(c) are schematic explanatory drawings showing a method of manufacturing a machined product according to an embodiment of the present invention.
Figure 20:
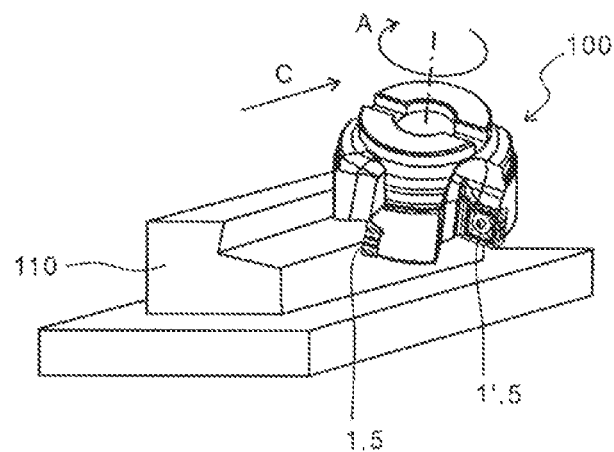
Figure 20:
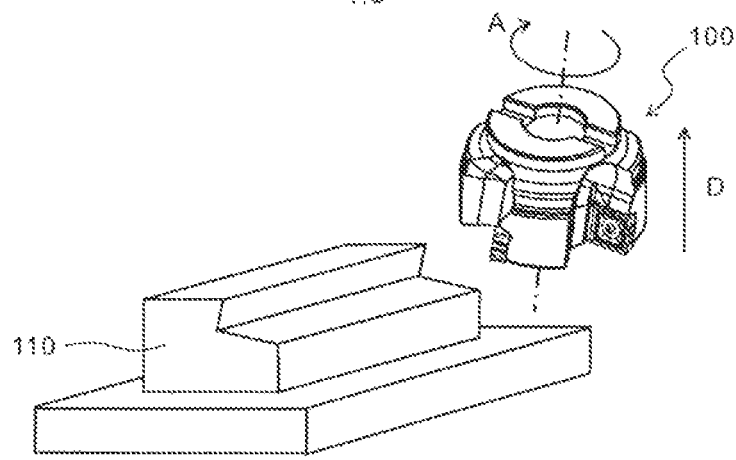

A method of manufacturing a machined product according to an embodiment of the present invention is described in detail below with reference to FIG. 20.

The method of manufacturing the machined product according to the present embodiment is carried out using the cutting tool 100 according to the foregoing first embodiment, and includes the following steps (i) to (iv):

(i) rotating the cutting tool 100 around the central axis 105 of the holder 101 in a direction of arrow A, as shown in FIG. 20(a);

(ii) bringing the cutting tool 100 near the workpiece 110 by moving the cutting tool 100 being rotated, in a direction of arrow B, as shown in FIG. 20(a);

(iii) cutting a surface of the workpiece 110 by moving the cutting tool 100 in a direction of arrow C while bringing the cutting edges 5 of the inserts 1 and 1' into contact with the surface of the workpiece 110, as shown in FIG. 20(b); and (iv) separating the cutting tool 100 from the workpiece 110 by moving the cutting tool 100 in a direction of arrow D, as shown in FIG. 20(c).

A desired machined product can be obtained by cutting the workpiece 110 in the foregoing manner.

In the present embodiment, the cutting workpiece 110 is cut using the foregoing cutting tool 110. Particularly in the step (iii), machining of high cutting performance is achieved, thereby improving machining efficiency and machined surface accuracy.

It is capable of exhibiting excellent chip discharge performance, and performing stable cutting processing for a long period of time even when the workpiece 110 is a material having rich ductility. Examples of the workpiece 110 having rich ductility include austenitic stainless steel, such as SUS304, and chromium molybdenum steel, such as SCM915.

In the step (ii), the workpiece 110 and the cutting tool 100 need to be brought near each other. For example, the workpiece 110 may be brought near the cutting tool 100. Similarly, in the step (iv), the workpiece 110 and the cutting tool 100 need to be separated from each other. For example, the workpiece 110 may be separated from the cutting tool 100.

When the cutting processing is continued, it is merely required to repeat the step of bringing the cutting edges 5 of the cutting tool 100 into contact with different portions of the workpiece 110 while holding the rotation of the cutting tool 110.

When the cutting edge 5 being used is worn, the cutting edge 5 not yet used is used therefor by rotating the inserts 1 and 1' 90 degrees with respect to the center axis of the through hole 25.

While the several embodiments according to the present invention have been described and illustrated above, it is to be understood that the present invention is not limited to the foregoing embodiments, and various improvements and changes can be made within the scope of the appended claims.

For example, in the insert 1 according to the first embodiment, the description has been made of the case where the upper surface 2 has the square shape in a top view. However, the shape of the upper surface 2 is not limited thereto. That is, the upper surface 2 may have a polygonal shape in the top view, such as triangle, rhombate, hexagon, and octagon.

The shape of the insert 1 is not limited to one in which the upper surface 2 has a polygonal shape. It is possible to employ any shape allowing the concave parts 6 to be formed on the side surface 4, and allowing the specific first and second raised parts 8 and 9 to be formed on the upper surface 2.

Although in the foregoing description, the rake surface 22 and the rising surface 24 are continuous with each other by interposing therebetween the bottom surface 23 made up of the concave-shaped curved surface, the bottom surface 23 may be a flat surface. Alternatively, the rake surface 22 and the rising surface 24 may be directly continuous with each other without interposing the bottom surface 23 therebetween. When the rake surface 22 and the rising surface 24 are directly continuous with each other, the first edge portion 9b of the second raised part 9 is preferably continuous with the rake surface 22.

Although in the foregoing description, the number of the concave parts 6 is four or three, the number of the concave parts 6 is usually selected optionally in the range of two to six, preferably two to four, in order to avoid strength deterioration of the insert 1 and decrease the cutting resistance.

Although in the foregoing description, the upper portions 8a and 9a of the first raised part 8 and the second raised part 9 are the curved surfaces, the upper portions 8a and 9a may have other surface shape, such as a flat surface and an inclined surface, or may be a ridge line.

Particularly, when the upper portion 9a of the second raised part 9 is the inclined surface, an inclination angle of the inclined surface is preferably the same as the rising angle θ2 of the rising surface 24. This permits smooth contact and graze of chips with respect to the upper portion 9a of the second raised part 9 and the rising surface 24.

In the cutting tool 100 according to the first embodiment, the inserts 1 and 1' having the different number of concave parts are combined and attached. It is also possible to attach, for example, only the inserts having the same number of concave parts. In this case, it is required to alternately attach the inserts in the circumferential direction of the holder in such an arrangement allowing a region remaining uncut by one of the inserts to be cut by the other insert.

The cutting tool 100 is also applicable to other cutting tools, such as end mills and side cutters, besides the face milling cutters.

The invention claimed is:

1. A cutting insert, comprising:
an upper surface;
a lower surface;
a side surface located between the upper surface and the lower surface;
at least one concave part extending in a thickness direction in the side surface, and comprising one end thereof located at the upper surface; and
a cutting edge which is located at an intersection region of the upper surface and the side surface, and is divided into a plurality of divided cutting edges with the at least one concave part interposed therebetween, wherein
the upper surface comprises
a first raised part located inwardly of the at least one concave part, and
a plurality of second raised parts respectively located inwardly of the plurality of divided cutting edges and spaced apart from the plurality of the divided cutting edges, and
the plurality of the second raised parts are located further inward relative to the divided cutting edges adjacent thereto than an end of the first raised part closest to the cutting edge in a top view.

2. A cutting insert, comprising:
an upper surface;
a lower surface;
a side surface located between the upper surface and the lower surface;
at least one concave part extending in a thickness direction in the side surface, and comprising one end thereof located at the upper surface; and
a cutting edge which is located at an intersection region of the upper surface and the side surface, and is divided into a plurality of divided cutting edges with the at least one concave part interposed therebetween, wherein
the upper surface comprises
a first raised part located inwardly of the at least one concave part, and
a plurality of second raised parts respectively located inwardly of the plurality of divided cutting edges, and
the plurality of the second raised parts are located inward compared to one end of the first raised part closer to the cutting edge in a top view, and
upper portions of the plurality of second raised parts each extends along a direction perpendicular to the cutting edge.

3. A cutting insert, comprising:
an upper surface;
a lower surface;
a side surface located between the upper surface and the lower surface;
at least one concave part extending in a thickness direction in the side surface, and comprising one end thereof located at the upper surface; and
a cutting edge which is located at an intersection region of the upper surface and the side surface, and is divided into a plurality of divided cutting edges with the at least one concave part interposed therebetween, wherein
the upper surface comprises
a first raised part located inwardly of the at least one concave part, and
a plurality of second raised parts respectively located inwardly of the plurality of divided cutting edges, and
the plurality of the second raised parts are located inward compared to one end of the first raised part closer to the cutting edge in a top view, each of the plurality the second raised parts comprises
a first edge portion located closer to the cutting edge, and
a second edge portion located opposite the first edge portion, and
the first edge portion and the second edge portion each has a convex shape toward the cutting edge in a top view.

4. The cutting insert according to claim 1, wherein the plurality of second raised parts are located closer to the lower surface than a line which passes through the upper part of the first raised part, and is parallel to the lower surface.

5. The cutting insert according to claim 1, wherein each of the plurality of second raised parts further comprises a pair of side portions which are located at both sides of the upper part in a top view, and are inclined from the upper portion toward the lower surface, and an angle formed by the pair of side portions is an obtuse angle.

6. The cutting insert according to claim 1, wherein
the upper surface further comprises a breaker groove located along the cutting edge and having a concave shape,
the breaker groove comprises
a rake surface which is located closer to the cutting edge, and is inclined closer to the lower surface as the rake surface going inward, and
a rising surface which is located inward compared to the rake surface and is inclined further away from the lower surface as the rising surface going inward,
the upper surface comprises a plurality of the first raised parts, and
each of the plurality of second raised parts is located in the rising surface, and is located at a midportion which is located between the first raised parts adjacent to each other among the plurality of first raised parts, and is located in a direction along the cutting edge, in a top view.

7. The cutting insert according to claim 6, wherein the upper portion of the second raised part is inclined at an angle identical to a rising angle of the rising surface.

8. The cutting insert according to claim 6, wherein the rising surface is inclined from the first raised part toward the lower surface as the rising surface going to the second raised part adjacent thereto among the plurality of second raised parts.

9. The cutting insert according to claim 1, wherein the upper surface further comprises a plurality of flat regions which are continuous with the plurality of divided cutting edges, respectively, and have a distance L1 in a direction away from each of the divided cutting edges decreasing as going from both end portions of each of the divided cutting edges to a midportion thereof.

10. The cutting insert according to claim 9, wherein each of the plurality of flat regions comprises a first region which is located at the midportion and has the distance L1 constant.

11. The cutting insert according to claim 10, wherein each of the plurality of flat regions further comprises a second region which is located close to the both end portions with respect to the first region and has the distance L1 constant.

12. The cutting insert according to claim 10, wherein in the first region, a distance L2 in a direction along the divided cutting edges is not less than a width of the at least one concave.

13. The cutting insert according to claim 11, wherein
the upper surface further comprises a rake surface continuous with the plurality of flat regions, and
the rake surface comprises a first rake surface located inwardly of the first region and a second rake surface located inwardly of the second region, and a rake angle of the first rake surface is smaller than a rake angle of the second rake surface.

14. The cutting insert according to claim 1, wherein
the upper surface further comprises
a plurality of flat regions respectively located inwardly of the plurality of divided cutting edges, and
a plurality of rake surfaces which are respectively located inwardly of the plurality of flat regions, and are inclined closer to the lower surface as departing from the flat regions,
a boundary region of each of the flat regions and each of the rake surfaces comprises two first boundary regions located close to both ends of the boundary region, and a second boundary region located between the two first boundary regions and located closer to the divided cutting edges than the first boundary regions, and
the plurality of rake surfaces comprise a third rake surface located inwardly of the two first boundary regions, and a fourth rake surface located inwardly of the second boundary region, and the two first boundary regions are located at a higher position than the fourth rake surface.

15. The cutting insert according to claim 14, wherein the fourth rake surface has a concave shape in a cross-sectional view including the two first boundary regions.

16. The cutting insert according to claim 14, wherein a rake angle of the fourth rake surface is not more than a rake angle of the third rake surface.

17. The cutting insert according to claim 14, wherein
the upper surface comprises at least two the first raised parts, and
a length of the second boundary region is not more than a distance between the first raised parts adjacent to each other.

18. A cutting tool, comprising:
a cutting insert according to claim 1; and
a holder configured to attach the cutting insert to a front end thereof.

19. A cutting tool, comprising:
a holder with a plurality of insert pockets located on an outer peripheral surface close to a front end thereof; and
a plurality of cutting inserts according to claim 1 attached to the plurality of insert pockets, respectively, wherein
the plurality of cutting inserts comprise first and second cutting inserts attached to the plurality of insert pockets, and the plurality of divided cutting edges thereof protrude from an outer peripheral surface of the holder, and
the at least one concave part of the second cutting insert is arranged overlappingly with the plurality of divided cutting edges of the first cutting insert in a view along the same circumference of the holder.

20. A method of manufacturing a machined product, comprising:
rotating a cutting tool according to claim 18;
bringing the cutting tool being rotated and a workpiece close together;
bringing the cutting edge of the cutting tool and the workpiece into contact with each other; and
separating the cutting tool and the workpiece from each other.

* * * * *